US012700058B2

(12) United States Patent
Jiang et al.

(10) Patent No.: US 12,700,058 B2
(45) Date of Patent: Aug. 4, 2026

(54) VIDEO PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Boyuan Jiang, Shenzhen (CN); Lingtong Kong, Shenzhen (CN); Donghao Luo, Shenzhen (CN); Ying Tai, Shenzhen (CN); Chengjie Wang, Shenzhen (CN); Xiaoming Huang, Shenzhen (CN); Jilin Li, Shenzhen (CN); Feiyue Huang, Shenzhen (CN); Yongjian Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 18/456,027

(22) Filed: Aug. 25, 2023

(65) Prior Publication Data

US 2023/0401672 A1      Dec. 14, 2023

Related U.S. Application Data

(63) Continuation of application No. PCT/CN2022/124567, filed on Oct. 11, 2022.

(30) Foreign Application Priority Data

Dec. 9, 2021     (CN) .......................... 202111500576.0

(51) Int. Cl.
*G06T 3/4007*      (2024.01)
*G06T 7/246*      (2017.01)

(52) U.S. Cl.
CPC ............ *G06T 3/4007* (2013.01); *G06T 7/246* (2017.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2019/0273948 A1 | 9/2019 | Yin et al. | |
| 2020/0394752 A1 | 12/2020 | Liu et al. | |

(Continued)

FOREIGN PATENT DOCUMENTS

| | | |
|---|---|---|
| CN | 112104830 A | 12/2020 |
| CN | 112422870 A | 2/2021 |

(Continued)

OTHER PUBLICATIONS

CN 112422870 Translation.*

(Continued)

*Primary Examiner* — Vikkram Bali
(74) *Attorney, Agent, or Firm* — Anova Law Group, PLLC

(57) ABSTRACT

A video processing method includes: obtaining a first video frame and a second video frame in a target video, the first video frame being a previous frame of the second video frame; inputting the first video frame and the second video frame to a target neural network, and obtaining a target intermediate video frame output by the target neural network, the target neural network being trained based on an optical flow distillation constraint and a feature consistency constraint; and interpolating the target intermediate video frame between the first video frame and the second video frame.

20 Claims, 8 Drawing Sheets

(56) References Cited

U.S. PATENT DOCUMENTS

| | | | |
|---|---|---|---|
| 2021/0327031 A1 | 10/2021 | Xie et al. | |
| 2022/0092795 A1* | 3/2022 | Liu | G06N 3/02 |
| 2022/0164921 A1* | 5/2022 | Noh | G06N 3/088 |
| 2023/0401672 A1 | 12/2023 | Jiang et al. | |

FOREIGN PATENT DOCUMENTS

| | | |
|---|---|---|
| CN | 113365110 A | 9/2021 |
| CN | 113542651 A | 10/2021 |
| CN | 114339409 A | 4/2022 |

OTHER PUBLICATIONS

The World Intellectual Property Organization (WIPO) International Search Report for PCT/CN2022/124567 Jan. 10, 2023 6 Pages (including translation).

Hyeongmin Lee et al. "Adacof: Adaptive collaboration of flows for video frame interpolation." Proceedings of the IEEE/CVF conference on computer vision and pattern recognition. 2020.

Junheum Park et al., "Asymmetric bilateral motion estimation for video frame interpolation." Proceedings of the IEEE/CVF International Conference on Computer Vision. 2021.

Junheum Park et al., "BMBC: Bilateral motion estimation with bilateral cost volume for video interpolation." Computer Vision—ECCV 2020: 16th European Conference, Glasgow, UK, Aug. 23-28, 2020, Proceedings, Part XIV 16. Springer International Publishing, 2020.

Tianyu Ding et al. "Cdfi: Compression-driven network design for frame interpolation." Proceedings of the IEEE/CVF conference on computer vision and pattern recognition. 2021.

Myungsub Choi et al., "Channel attention is all you need for video frame interpolation." Proceedings of the AAAI Conference on Artificial Intelligence. Vol. 34. No. 07. 2020.

Wenbo Bao et al. "Depth-aware video frame interpolation." Proceedings of the IEEE/CVF conference on computer vision and pattern recognition. 2019.

Zhewei Huang et al. "Real-time intermediate flow estimation for video frame interpolation." European Conference on Computer Vision. Cham: Springer Nature Switzerland, 2022.

Simon Niklaus et al., "Video frame interpolation via adaptive separable convolution." Proceedings of the IEEE international conference on computer vision. 2017.

The European Patent Office (EPO) The Extended European Search Report for Application No. 229030010 Feb. 17, 2025 25 Pages.

Zhewei Huang et al. "RIFE: Real-Time intermediate flow estimation for video frame interpolation." arxiv.org, Cornell University Library, 201Olin Library Cornell University Ithaca, NY14853, Nov. 8, 2021 (Nov. 8, 2021).

Lingtong Kong et al. "Ifrnet: Intermediate feature refine network for efficient frame interpolation." arxiv.org, Cornell University Library, 201Olin Library Cornell University Ithaca, NY14853, May 29, 2022 (May 29, 2022).

* cited by examiner

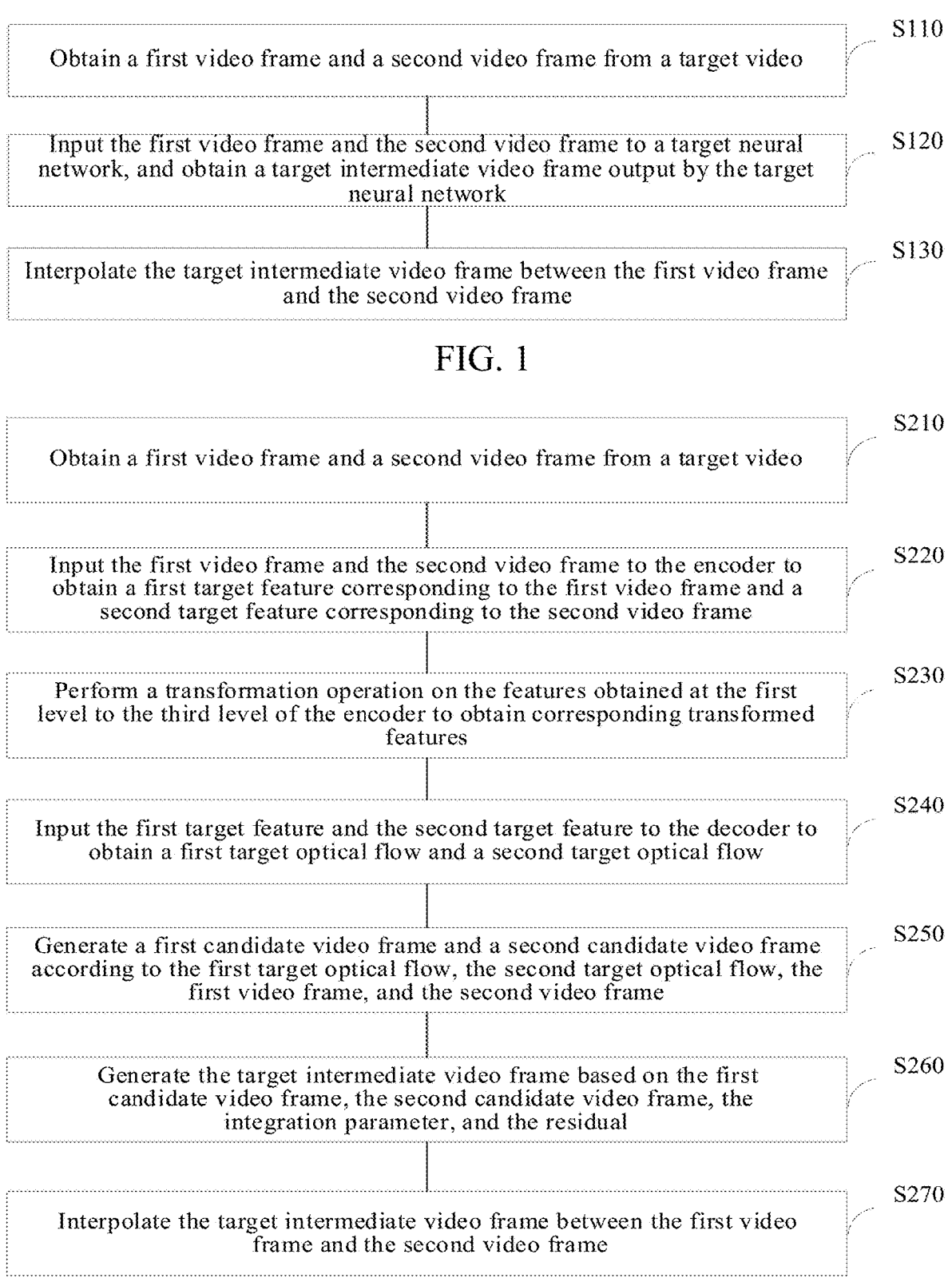

S110

Obtain a first video frame and a second video frame from a target video

S120

Input the first video frame and the second video frame to a target neural network, and obtain a target intermediate video frame output by the target neural network

S130

Interpolate the target intermediate video frame between the first video frame and the second video frame

Obtain a first video frame and a second video frame from a target video

S220

Input the first video frame and the second video frame to the encoder to obtain a first target feature corresponding to the first video frame and a second target feature corresponding to the second video frame

S230

Perform a transformation operation on the features obtained at the first level to the third level of the encoder to obtain corresponding transformed features

S240

Input the first target feature and the second target feature to the decoder to obtain a first target optical flow and a second target optical flow

S250

Generate a first candidate video frame and a second candidate video frame according to the first target optical flow, the second target optical flow, the first video frame, and the second video frame

S260

Generate the target intermediate video frame based on the first candidate video frame, the second candidate video frame, the integration parameter, and the residual

S270

Interpolate the target intermediate video frame between the first video frame and the second video frame

FIG. 2

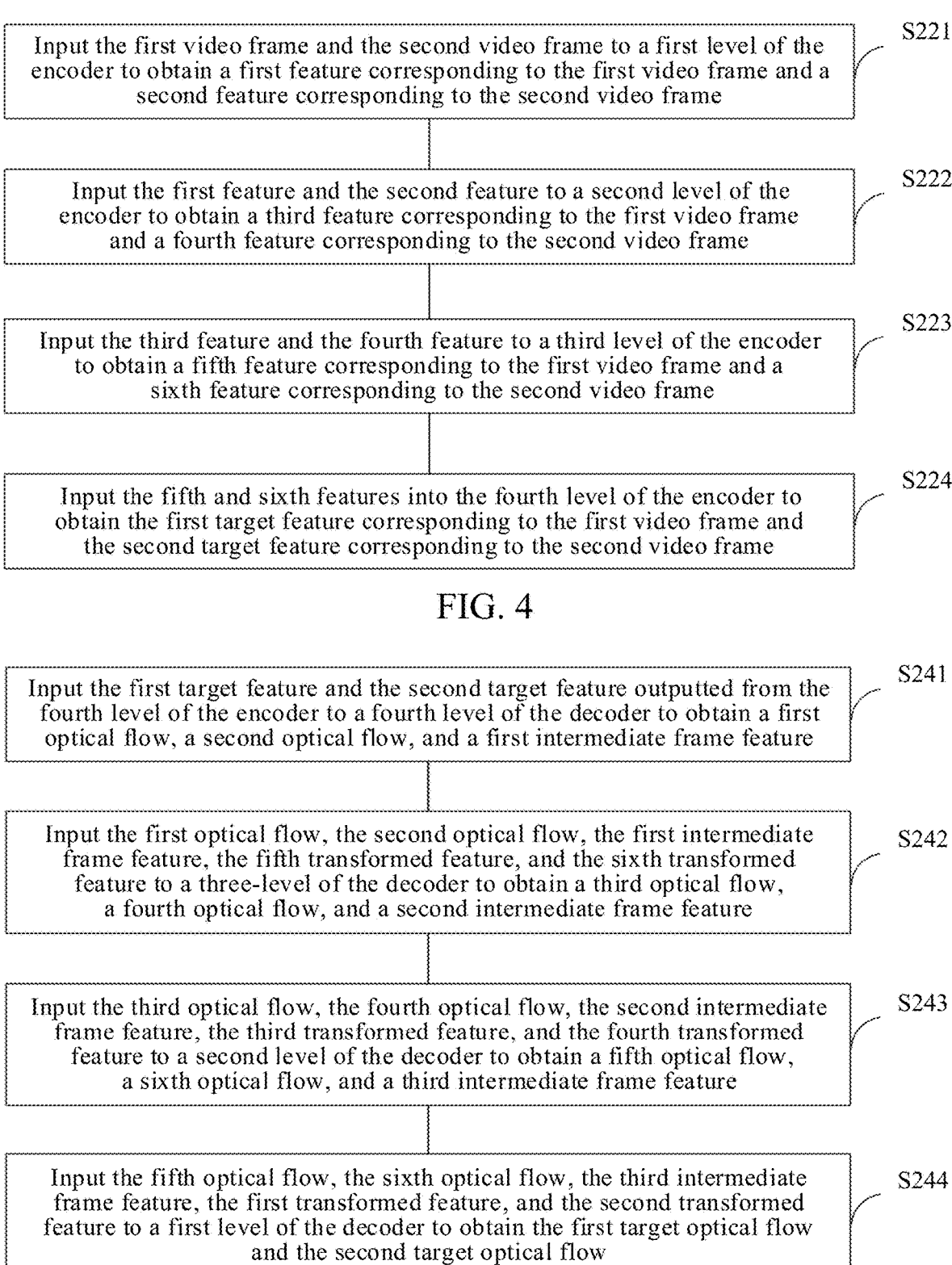

Input the first video frame and the second video frame to a first level of the encoder to obtain a first feature corresponding to the first video frame and a second feature corresponding to the second video frame ⟋ S221

Input the first feature and the second feature to a second level of the encoder to obtain a third feature corresponding to the first video frame and a fourth feature corresponding to the second video frame ⟋ S222

Input the third feature and the fourth feature to a third level of the encoder to obtain a fifth feature corresponding to the first video frame and a sixth feature corresponding to the second video frame ⟋ S223

Input the fifth and sixth features into the fourth level of the encoder to obtain the first target feature corresponding to the first video frame and the second target feature corresponding to the second video frame ⟋ S224

FIG. 4

Input the first target feature and the second target feature outputted from the fourth level of the encoder to a fourth level of the decoder to obtain a first optical flow, a second optical flow, and a first intermediate frame feature ⟋ S241

Input the first optical flow, the second optical flow, the first intermediate frame feature, the fifth transformed feature, and the sixth transformed feature to a three-level of the decoder to obtain a third optical flow, a fourth optical flow, and a second intermediate frame feature ⟋ S242

Input the third optical flow, the fourth optical flow, the second intermediate frame feature, the third transformed feature, and the fourth transformed feature to a second level of the decoder to obtain a fifth optical flow, a sixth optical flow, and a third intermediate frame feature ⟋ S243

Input the fifth optical flow, the sixth optical flow, the third intermediate frame feature, the first transformed feature, and the second transformed feature to a first level of the decoder to obtain the first target optical flow and the second target optical flow ⟋ S244

FIG. 5

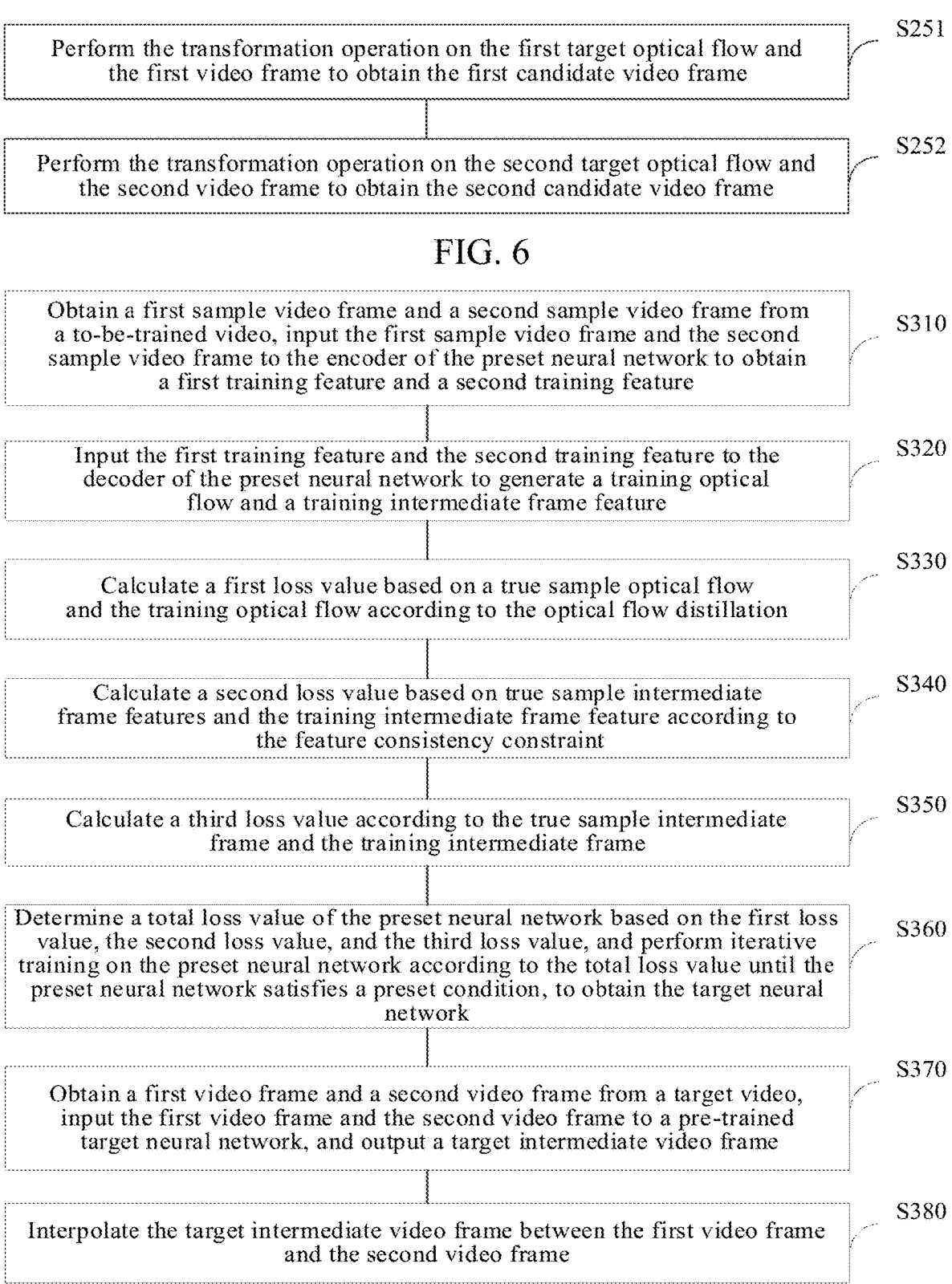

S251

Perform the transformation operation on the first target optical flow and the first video frame to obtain the first candidate video frame

S252

Perform the transformation operation on the second target optical flow and the second video frame to obtain the second candidate video frame

Obtain a first sample video frame and a second sample video frame from a to-be-trained video, input the first sample video frame and the second sample video frame to the encoder of the preset neural network to obtain a first training feature and a second training feature

S320

Input the first training feature and the second training feature to the decoder of the preset neural network to generate a training optical flow and a training intermediate frame feature

S330

Calculate a first loss value based on a true sample optical flow and the training optical flow according to the optical flow distillation

S340

Calculate a second loss value based on true sample intermediate frame features and the training intermediate frame feature according to the feature consistency constraint

S350

Calculate a third loss value according to the true sample intermediate frame and the training intermediate frame

S360

Determine a total loss value of the preset neural network based on the first loss value, the second loss value, and the third loss value, and perform iterative training on the preset neural network according to the total loss value until the preset neural network satisfies a preset condition, to obtain the target neural network

S370

Obtain a first video frame and a second video frame from a target video, input the first video frame and the second video frame to a pre-trained target neural network, and output a target intermediate video frame

S380

Interpolate the target intermediate video frame between the first video frame and the second video frame

FIG. 7

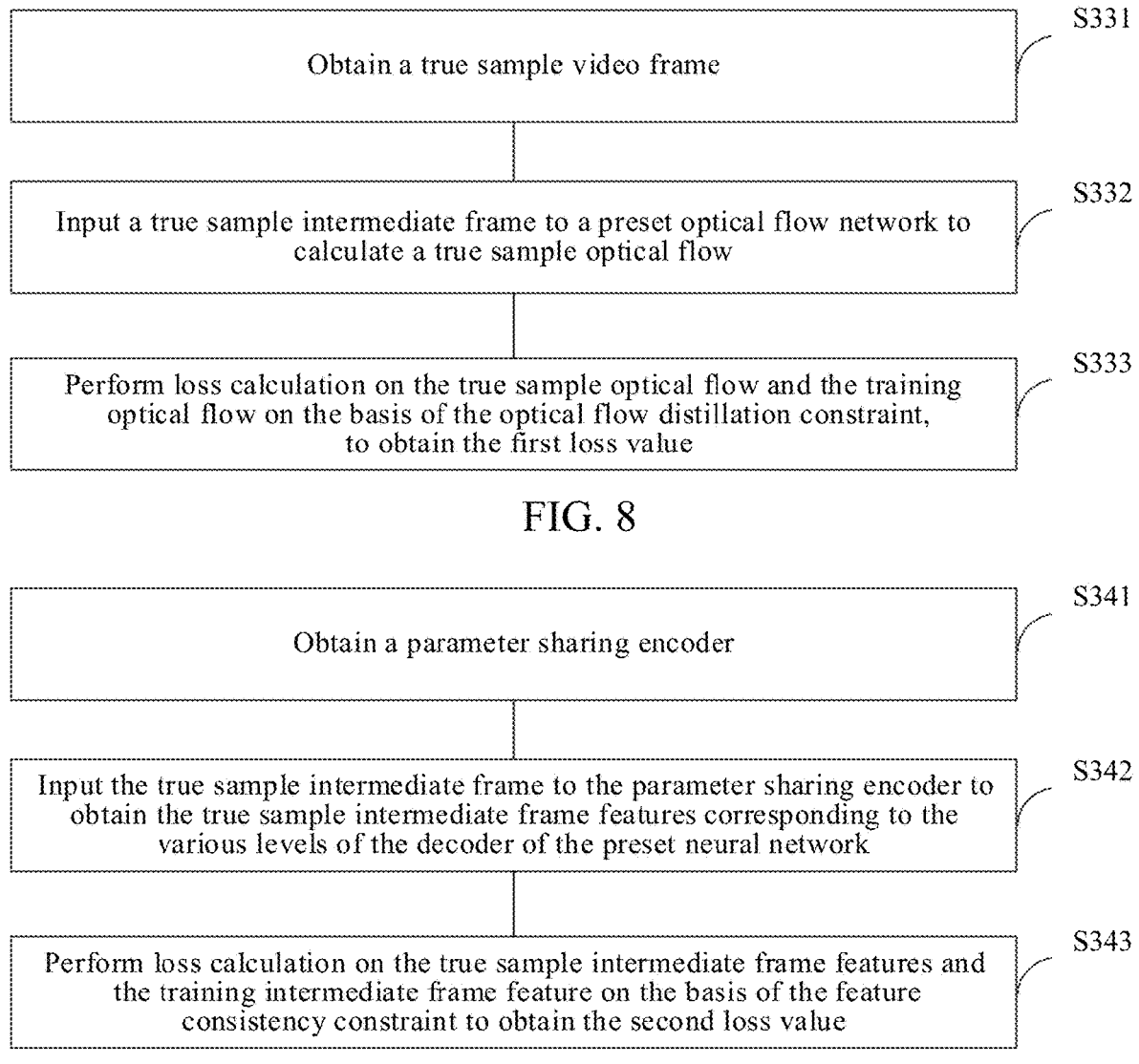

S331

Obtain a true sample video frame

S332

Input a true sample intermediate frame to a preset optical flow network to calculate a true sample optical flow

S333

Perform loss calculation on the true sample optical flow and the training optical flow on the basis of the optical flow distillation constraint, to obtain the first loss value

Obtain a parameter sharing encoder

S342

Input the true sample intermediate frame to the parameter sharing encoder to obtain the true sample intermediate frame features corresponding to the various levels of the decoder of the preset neural network

S343

Perform loss calculation on the true sample intermediate frame features and the training intermediate frame feature on the basis of the feature consistency constraint to obtain the second loss value

FIG. 9

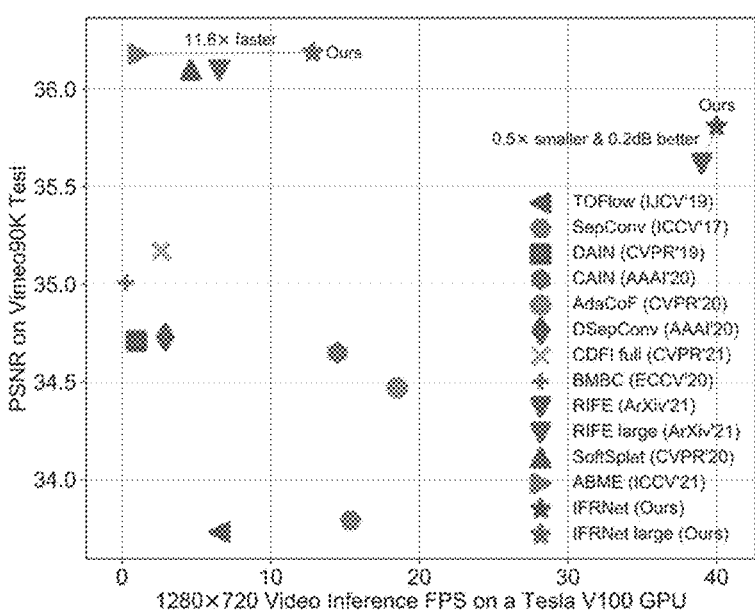
FIG. 10
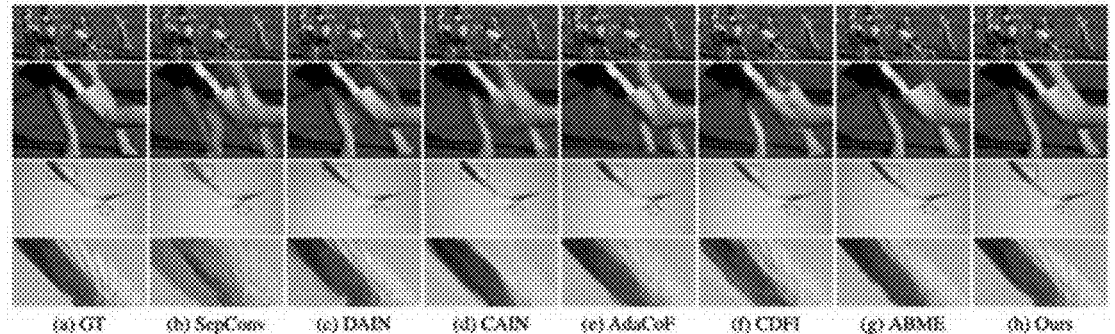
FIG. 11
| Method | Vimeo90K | UCF101 | SNU-FILM | | | | Time (s) | Params (M) |
|---|---|---|---|---|---|---|---|---|
| | | | Easy | Medium | Hard | Extreme | | |
| SepConv | 33.79/0.9702 | 34.78/0.9669 | 39.41/0.9900 | 34.97/0.9762 | 29.36/0.9253 | 24.31/0.8448 | 0.065 | 21.7 |
| CAIN | 34.65/0.9730 | 34.91/0.9690 | 39.89/0.9900 | 35.61/0.9776 | 29.90/0.9292 | 24.78/0.8507 | 0.069 | 42.8 |
| AdaCoF | 34.47/0.9730 | 34.90/0.9680 | 39.80/0.9900 | 35.05/0.9754 | 29.46/0.9244 | 24.31/0.8439 | 0.054 | 21.8 |
| RIFE | 35.62/0.9780 | 35.28/0.9690 | 40.06/0.9907 | 35.75/0.9789 | 30.10/0.9330 | 24.84/0.8534 | 0.026 | 9.8 |
| IFRNet | 35.81/0.9794 | 35.31/0.9695 | 40.01/0.9905 | 35.59/0.9795 | 30.51/0.9364 | 25.15/0.8593 | 0.028 | 4.9 |
| ToFlow | 33.73/0.9682 | 34.58/0.9667 | 39.08/0.9890 | 34.39/0.9740 | 28.44/0.9180 | 23.39/0.8310 | 0.152 | 1.4 |
| CyclicGen | 32.09/0.9490 | 35.11/0.9684 | 37.72/0.9840 | 32.47/0.9554 | 26.95/0.8871 | 22.70/0.8083 | 0.161 | 19.8 |
| DAIN | 34.71/0.9756 | 34.99/0.9683 | 39.73/0.9902 | 35.46/0.9780 | 30.17/0.9335 | 25.09/0.8584 | 1.033 | 24.0 |
| BMBC | 35.01/0.9764 | 35.15/0.9689 | 39.90/0.9902 | 35.31/0.9774 | 29.33/0.9270 | 23.92/0.8432 | 3.845 | 11.0 |
| CDFI full | 35.17/0.9640 | 35.21/0.9500 | 40.09/0.9906 | 35.51/0.9778 | 29.73/0.9277 | 24.53/0.8476 | 0.380 | 5.0 |
| ABME | 36.18/0.9805 | 35.38/0.9698 | 39.59/0.9901 | 35.77/0.9789 | 30.58/0.9364 | 25.42/0.8639 | 0.905 | 18.1 |
| IFRNet large | 36.19/0.9807 | 35.42/0.9697 | 40.07/0.9906 | 36.15/0.9797 | 30.88/0.9371 | 25.38/0.8622 | 0.078 | 19.6 |
FIG. 12

400

500

600

VIDEO PROCESSING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/124567, filed on Oct. 11, 2022, which claims priority to Chinese Patent Application No. 202111500576.0, filed with the China National Intellectual Property Administration on Dec. 9, 2021, and entitled "VIDEO PROCESSING METHOD AND APPARATUS, COMPUTER DEVICE, AND STORAGE MEDIUM", the entire contents of both of which are incorporated herein by reference.

FIELD OF THE TECHNOLOGY

The present disclosure relates to the field of computer technologies, and in particular, to a video processing method and apparatus, a computer device, and a storage medium.

BACKGROUND

With the rapid development of a computer vision technology, people have increasingly high requirements for a video frame rate, and videos with high frame rates can greatly improve the watching experience of a user. To watch videos with higher fluency/clarity, people have increased the frame rate of videos captured by an existing camera from 25 FPS to 60 FPS, and then to 240 FPS or even higher. However, relying solely on hardware iteration of a camera to increase the frame rate is costly. Therefore, a video frame interpolation technology comes into being.

The purpose of video frame interpolation is to generate videos with high frame rates according to videos with low frame rates. A general operation of video frame interpolation is to generate an image of an intermediate frame between images of two adjacent video frames. At present, most video frame interpolation methods include modeling an object motion to estimate an optical flow of the intermediate frame.

SUMMARY

In view of the above problems, the present disclosure provides a video processing method and apparatus, a computer device, and a storage medium.

Some embodiments of the present disclosure provide a video processing method, including: obtaining a first video frame and a second video frame in a target video, the first video frame being a previous frame of the second video frame; inputting the first video frame and the second video frame to a target neural network, and obtaining a target intermediate video frame output by the target neural network, the target neural network being trained based on an optical flow distillation constraint and a feature consistency constraint; and interpolating the target intermediate video frame between the first video frame and the second video frame.

Some embodiments of the present disclosure provide a video processing apparatus, including: an obtaining module, configured to obtain a first video frame and a second video frame in a target video, the first video frame being a previous frame of the second video frame; an outputting module, configured to: input the first video frame and the second video frame to a target neural network, and obtain a target intermediate video frame output by the target neural network, the target neural network being trained based on an optical flow distillation constraint and a feature consistency constraint; and a frame interpolation module, configured to interpolate the target intermediate video frame between the first video frame and the second video frame.

Some embodiments of the present disclosure further provide a computer device, including one or more processors and at least one memory; and. The at least one memory; and stores computer program instructions, and the computer program instructions are invoked by the one or more processors to implement the video processing method provided in the above first aspect.

Some embodiments of the present disclosure further provide a non-transitory computer-readable storage medium. The computer-readable storage medium stores program codes. The program codes are run on a processor to implement the video processing method provided in the above first aspect.

Some embodiments of the present disclosure further provide a computer program product or a computer program. The computer program product or the computer program includes computer instructions stored in a storage medium. A processor of a computer device reads the computer instructions from the storage medium and executes the computer instructions, causing the computer to implement the steps in the above video processing method.

The target neural network used in the technical solutions of the present disclosure is trained based on the optical flow distillation constraint and the feature consistency constraint. Therefore, knowledge of a pre-trained optical flow network is transferred to learning of the target neural network through the optical flow distillation constraint, thereby eliminating dependency on an external optical flow network. In addition, the network can learn more intermediate frame information through the feature consistency constraint. Thus, the target intermediate video frame is interpolated between the first video frame and the second video frame, which greatly increases the speed of video frame interpolation and enhances the display effect of video frame interpolation.

BRIEF DESCRIPTION OF THE DRAWINGS

In order to illustrate the technical solutions in the embodiments of the present disclosure more clearly, the following briefly introduces the accompanying drawings required in the description of the embodiments. Obviously, the accompanying drawings described below are only some embodiments of the present disclosure. Those of ordinary skill in the art can also obtain other drawings according to the drawings without any creative work.

FIG. 1 shows a flowchart of a video processing method provided according to an embodiment of the present disclosure.

FIG. 2 shows a flowchart of another video processing method provided according to an embodiment of the present disclosure.

FIG. 4 shows a flowchart of a step of generating a first target feature and a second target feature in FIG. 2.

FIG. 5 shows a flowchart of a step of generating a first target optical flow and a second target optical flow in FIG. 2.

FIG. 6 shows a flowchart of a step of generating a first candidate video frame and a second candidate video frame in FIG. 2.

FIG. 7 shows a flowchart of still another video processing method provided according to an embodiment of the present disclosure.

FIG. 8 shows a flowchart of a step of calculating a first loss value in FIG. 7.

FIG. 9 shows a flowchart of a step of calculating a second loss value in FIG. 7.

FIG. 10 shows a diagram of speed-effect comparison of a frame interpolation method provided according to an embodiment of the present disclosure.

FIG. 11 shows a diagram of a visualization effect of video frame interpolation provided according to an embodiment of the present disclosure.

FIG. 12 shows a diagram of a test result of video frame interpolation provided according to an embodiment of the present disclosure.

DESCRIPTION OF EMBODIMENTS

Figure 3:
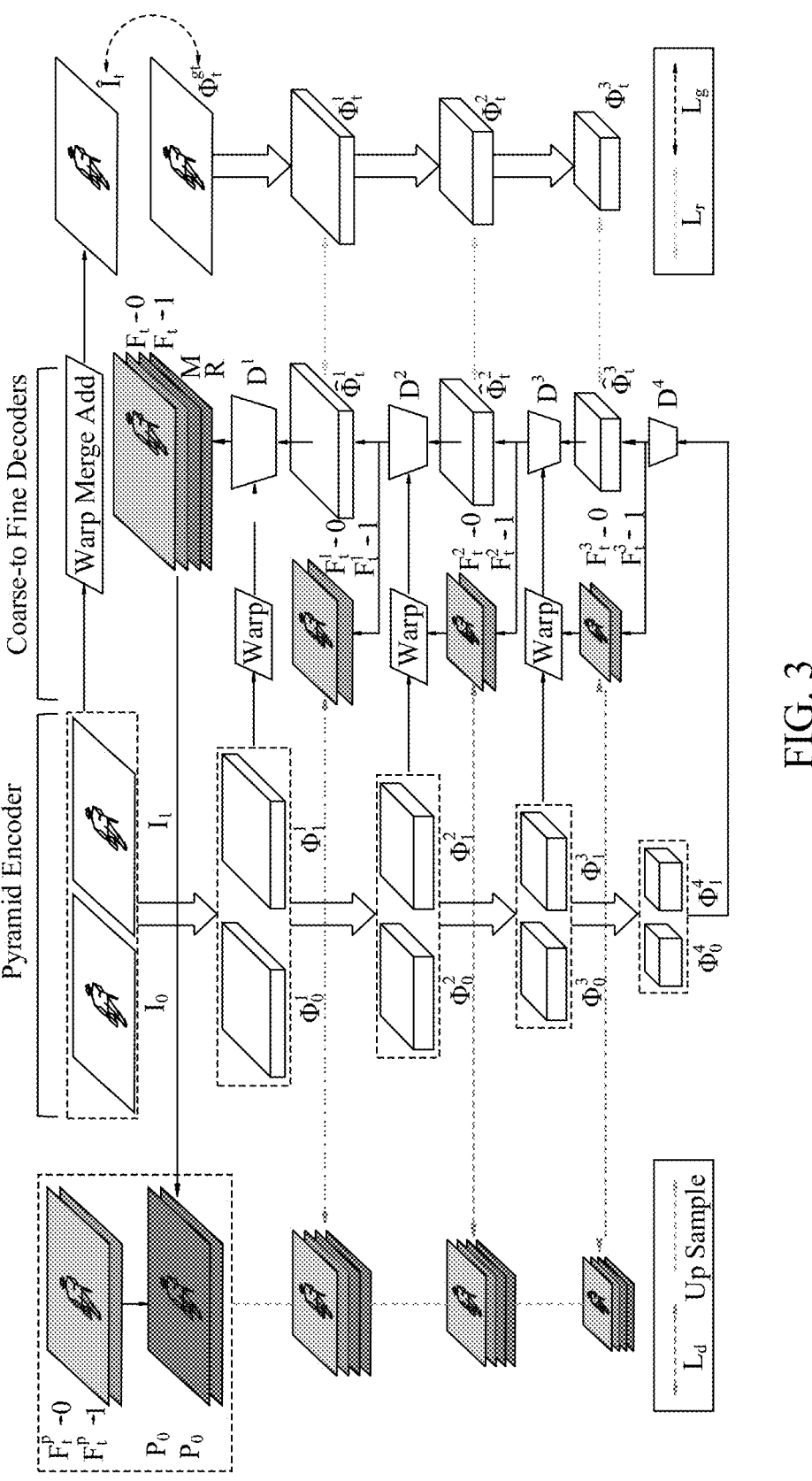
FIG. 3 shows a diagram of a network architecture of a video processing method provided according to an embodiment of the present disclosure.

Implementations of the present disclosure are described in detail below, and examples of the implementations are shown in accompanying drawings, where the same or similar elements or the elements having same or similar functions are denoted by the same or similar reference numerals throughout the description. The implementations described below with reference to the accompanying drawings are exemplary and used only for explaining the present disclosure, and should not be construed as a limitation on the present disclosure.

To make a person in the art understand the solutions of the present disclosure better, the following clearly and completely describes the technical solutions in the embodiments of the present disclosure with reference to the accompanying drawings in the embodiments of the present disclosure. Apparently, the described embodiments are only some embodiments rather than all the embodiments of the present disclosure. Based on the embodiments in the present disclosure, all other embodiments obtained by those skilled in the art without creative work all fall within the protection scope of the present disclosure.

In order to improve the experience of a user for watching videos, terminal service providers usually use a video frame interpolation technology to optimize videos, so that the fluency of video pictures will be significantly improved. Video frame interpolation algorithms can be roughly divided into three categories according to different synthesis methods of intermediate frames (intermediate video frames): an optical flow-based method, a kernel-based method, and an image generation-based method.

The kernel-based method generates images by performing convolution on local blocks near each output pixel, and synthesizes intermediate frames by performing a convolution operation on the local blocks around each output pixel. However, this method cannot handle large motions that exceed a size of a kernel, and typically has high computation costs. The image generation-based method can generate more detailed texture structures, but if there are objects with large motions in a video, problems such as ghosting may occur, which affects the watching experience of the video after frame interpolation.

Due to the influence of Convolutional Neural Networks (CNNs) in deep learning, which can understand a motion law of pixel values in images over time by predicting optical flows, most existing video frame interpolation algorithms are the optical flow-based (an instantaneous speed of a pixel motion observed by spatial moving objects on an imaging plane) methods. For example, a Depth-Aware Video Frame Interpolation (DAIN) algorithm includes an optical flow estimation module, a deep estimation module, a feature extraction module, and an interpolation kernel estimation module. Corresponding optical flow maps, depth maps, feature maps, and interpolation kernels of inputted previous and latter frame images are separately obtained through the four modules. Then, optical flows and a local interpolation kernel are used to twist the inputted frames, the depth maps, and content features, and transmit them into a target frame synthesis network to synthesize an outputted frame.

The DAIN algorithm estimates an optical flow of an intermediate frame relative to a previous frame by estimating optical flows of two adjacent frames and using linear hypothesis. This algorithm is only applicable to a case where an object has a uniform motion, otherwise, the optical flow of the intermediate frame estimated through the linear hypothesis will deviate significantly relative to an actual value. In response to this issue, a Quadratic Video Interpolation (QVI) algorithm is used to estimate an acceleration of an object by using three frames and then estimate an optical flow of an intermediate frame by using a uniformly accelerated motion.

Because motions of objects in a true scene are very complex, relying solely on uniform motion or more complex uniformly accelerated motion to perform motion modeling of a single mode cannot cover all situations. For this reason, existing methods usually combine a correction network to correct the estimated optical flow of the intermediate frame. However, this combination manner will significantly increase the temporal and spatial complexity of a neural network, thereby prolonging the inference time and hindering the deployment of the frame interpolation algorithm in practical application scenes.

In response to the above issues, a video processing method is proposed. Embodiments of the method can obtain a first video frame and a second video frame from a target video, input the first video frame and the second video frame to a target neural network, and obtain a target intermediate video frame output by the target neural network. The target neural network can be pre-trained based on an optical flow distillation constraint and a feature consistency constraint. Further, embodiments of the method can interpolate the target intermediate video frame between the first video frame and the second video frame. Thus, by inputting two adjacent video frames to the pre-trained target neural network obtained by training based on the optical flow distillation constraint and the feature consistency constraint, the target intermediate video frame is outputted for frame interpolation, so that a more accurate target intermediate video frame can be quickly outputted, which facilitates practical application of the video frame interpolation algorithm. Some embodiments of the video processing method will be explained in detail in subsequent embodiments.

Figure 13:
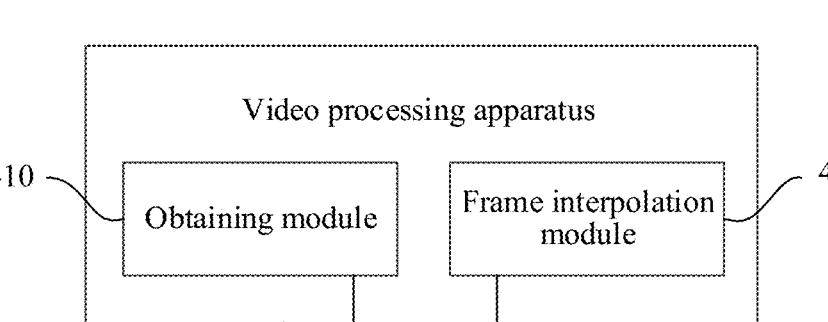
FIG. 13 shows a module block diagram of a video processing apparatus provided according to an embodiment of the present disclosure.

Referring to FIG. 1, FIG. 1 shows a flowchart of a video processing method provided according to an embodiment of the present disclosure. In one embodiment, the video processing method is applied to a video processing apparatus 400 as shown in FIG. 13 and a computer device 500 (FIG. 14) with the video processing apparatus 400. A computer device is taken as an example below to explain a specific flow of this embodiment.

Figure 16:
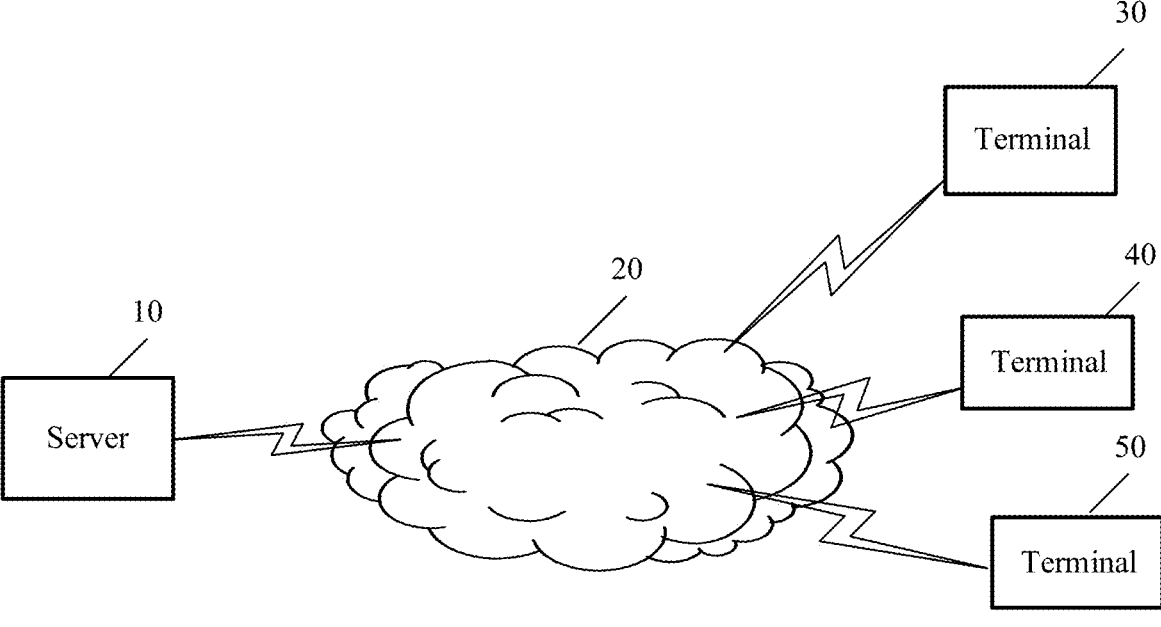
FIG. 16 is a schematic diagram of a network environment provided according to an embodiment of the present disclosure.

Of course, it can be understood that the computer device applied to this embodiment may be a server, a terminal, or the like. For example, the computer device may be any one or more devices among a server 10, a terminal 30, a terminal 40, and a terminal 50 in FIG. 16. FIG. 16 is a schematic diagram of a network environment provided according to an embodiment of the present disclosure. The server 10 may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), block chains, big data, and artificial intelligence platforms. The terminals 30 to 50 may be a smartphone, a tablet computer, a notebook computer, a desktop computer, a smart speaker, a smartwatch, or the like, but are not limited thereto. In an actual scene, a plurality of servers and a plurality of terminals may be deployed in a network environment. For clarity, FIG. 16 only shows an exemplary device.

The following describes in detail the flow shown in FIG. 1. The video processing method may specifically include the following steps.

Step S110: Obtain a first video frame and a second video frame from a target video.

In this embodiment of the present disclosure, an electronic device may obtain the target video that require frame interpolation. The target video may be a video frame sequence composed of consecutive video frames. It can be understood that each video frame is a frame image. The first video frame and the second video frame belong to the video frame sequence. The first video frame is a previous frame of the second video frame (e.g., a frame immediately preceding the second video frame, a neighboring frame preceding the second video frame).

In one embodiment, the computer device may download the target video through a network, and then obtain the first video frame and the second video frame from the video frame sequence of the target video. For example, a terminal device may retrieve the target video from a server through an Application Programming Interface (API). The server may be a specific server that stores or generates video frames for different application scenes. The terminal device may include computer devices with storage and computing functions, such as a smartphone and a tablet computer.

For example, in a live streaming viewing scene, a client obtains a live video in true time online from a media resource server of a live streaming platform through an API, and then obtains two adjacent video frames from a video frame sequence of the live video as a first video frame and a second video frame. In an application scene of using a virtual digital person for smart makeup, a smartphone may obtain a digital person frame video generated by a server through an API provided by smart makeup application software, and then perform a frame interpolation operation on the digital person frame video.

In another embodiment, the computer device may obtain the target video locally, that is, offline from a locally stored file. For example, when the computer device is a notebook computer, the notebook computer may obtain the target video from a hard disk, that is, the notebook computer stores the video in a local folder in advance, or downloads the video from a network and stores it to a local folder. To perform frame interpolation on the video, the notebook computer reads the video from the folder, and then obtains two adjacent video frames from a video frame sequence of the local video as the first video frame and the second video frame.

Step S120: Input the first video frame and the second video frame to a target neural network, and obtain a target intermediate video frame output by the target neural network.

When the computer device obtains the first video frame and the second video frame from the target video, the computer device may input the first video frame and the second video frame to the pre-trained target neural network to generate a target intermediate video frame. The target intermediate video frame refers to two consecutive video frames: new video frames $\hat{I}_t$ interpolated between the first video frame $I_{t\to0}$ and the second video frame $I_{t\to1}$.

In this embodiment of the present disclosure, the target neural network is trained based on an optical flow distillation constraint and a feature consistency constraint. The optical flow distillation constraint is a constraint established between an optical flow of an intermediate video frame generated by a network and an optical flow of a true sample intermediate frame (Ground Truth) in the training process of the target neural network. The feature consistency constraint essentially refers to a constraint established between a feature of the intermediate video frame generated by the network and a feature of the true sample intermediate frame in the training process of the target neural network. The process of training the target neural network based on the optical flow distillation constraint and the feature consistency constraint may eliminate dependency on an external optical flow network, thereby improving the efficiency of a network for generating target intermediate videos. At the same time, more information about intermediate frames can be learned, thereby improving the visualization effect of video frame interpolation. The target neural network may be composed of an encoder and a decoder.

In some embodiments, after obtaining the first video frame $I_{t\to0}$ and the second video frame $I_{t\to1}$ of the target video, the computer device may input the first video frame $I_{t\to0}$ and the second video frame $I_{t\to1}$ to the decoder of the target neural network, and the decoder performs feature extraction on images of the video frames to separately obtain features of the images of the video frames corresponding to the first video frame $I_{t\to0}$ and the second video frame $I_{t\to1}$. Further, the computer device inputs the corresponding features of the images of the video frames to the decoder to predict two optical flows of a new to-be-interpolated video frame $\hat{I}_t$ to the first video frame $I_{t\to0}$ and the second video frame $I_{t\to1}$, respectively. Further, the computer device generates a target intermediate video frame according to the above two optical flows.

Step S130: Interpolate the target intermediate video frame between the first video frame and the second video frame.

In one embodiment, the computer device may interpolate the obtained target intermediate video frame $\hat{I}_t$ between the first video frame $I_0$ and the second video frame $I_1$ after generating the target intermediate video frame through the target neural network. In some embodiments, in an actual video frame interpolation scene, the computer device may select multiple pairs of two adjacent video frames from the target video, and interpolate the intermediate video frame between the two adjacent video frames, thereby improving the fluency and clarity of the target video.

For example, to avoid a feeling of skipping frames in a piece of animation played by a computer, a video frame interpolation operation can be performed on a video frame sequence $\{I_0, I_1, I_2, I_3, \ldots, I_{n+1}\}$ of the animation, where n may be a time sequence of video frames of this piece of animation. The corresponding target intermediate video frames $\{I_{0.5}, I_{1.5}, I_{2.5}, \ldots, I_n\}$ may interpolated between every two adjacent video frames $\{I_0, I_1\}$, $\{I_1, I_2\}$, $\{I_2, I_3\}$, . . . , and $\{I_{n-1}, I_{n+1}\}$ of the video frame time sequence of the animation.

In this embodiment of the present disclosure, the computer device may obtain the first video frame and the second video frame from the target video, input the first video frame and the second video frame to the pre-trained target neural network, output the target intermediate video frame. The target neural network is trained based on an optical flow distillation constraint and a feature consistency constraint. The computer device interpolates the target intermediate video frame between the first video frame and the second video frame. Therefore, knowledge of a pre-trained optical flow network is transferred to learning of the target neural network through the optical flow distillation constraint, thereby eliminating dependency on an external optical flow network. In addition, the network can learn more intermediate frame information through the feature consistency constraint, thereby improving the efficiency of generating an optical flow from an intermediate frame to an adjacent frame.

Referring to FIG. 2, FIG. 2 shows another video processing method provided according to an embodiment of the present disclosure. In some embodiments, the video processing method is applied to a target neural network as shown in FIG. 3. A detailed description will be made below for a network architecture of the target neural network shown in FIG. 3.

In this embodiment of the present disclosure, an Artificial Intelligence (AI) technology is used. The AI technology involves a theory, a method, a technology, and an application system that use a digital computer or a machine controlled by the digital computer to simulate, extend, and expand human intelligence, sense an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The solutions provided in the embodiments of the present disclosure involve a CV technology in AI, and will be explained through the following embodiments:

The CV technology is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technology usually includes image processing, image recognition, image semantic understanding, image retrieval, Optical Character Recognition (OCR), video processing, video semantic understanding, video content/behavior recognition, 3-dimension (3D) object reconstruction, 3D technology, virtual reality, augmented reality, synchronous positioning, map construction and other technologies, as well as common face recognition, fingerprint recognition and other biometric feature recognition technologies.

In one embodiment, the target neural network may include an encoder and a decoder. In some embodiments, the encoder may use a pyramid encoder, and the decoder may use a coarse-to-fine decoder.

In some embodiments, the encoder may be composed of four convolution blocks. Each convolution block includes two convolution layers with convolution kernel sizes of 3×3 and step lengths of 2 and 1, respectively. Quantities of channels in the convolution layers of the four convolution blocks are 32, 48, 72, and 96, respectively. The decoder is also composed of four convolution blocks. Each convolution block includes two convolution layers with convolution kernel sizes of 3×3 and 4×4 and step lengths of 1 and ½, respectively. A quantity of channels of each convolution block is consistent with a quantity of channels of the convolution block of the encoder at the corresponding level. For example, the quantity of channels of convolution block $E^1$ of a first level of the encoder is correspondingly the same as the quantity of channels of convolution block $D^1$ of a first level of the decoder. Quantities of the convolution blocks of the encoder and the decoder or a quantity of the levels of the encoder/decoder may be set according to a resolution (Res) of the video frames of the inputted target video. In some embodiments, the quantity of the convolution blocks or the quantity num of the levels of the encoder/decoder satisfies $2^{num}<Res$, which will not be limited here. For example, when the resolution of the video frames of the target video is 256×256, at most eight levels can be set for the encoder/decoder.

A detailed explanation will be made below in combination with the flow shown in FIG. 2 and the diagram of the network architecture shown in FIG. 3. The video processing method may include the following steps.

Step S210: Obtain a first video frame and a second video frame from a target video.

In this embodiment, a specific implementation of step S210 may refer to the explanation of step S110 provided in the above embodiment, and will not be repeated here.

Step S220: Input the first video frame and the second video frame to the encoder to obtain a first target feature corresponding to the first video frame and a second target feature corresponding to the second video frame.

In this embodiment of the present disclosure, the first target feature refers to a feature of a video frame outputted by the convolution block of the last level of the encoder after the first video frame is encoded by the encoder. The second target feature refers to a feature of a video frame outputted by the convolution block of the last level of the encoder after the second video frame is encoded by the encoder.

In some embodiments, the encoder comprises N levels, N being an integer greater than 2. Step S220 may include: inputting the first video frame and the second video frame to a first level of the encoder to obtain a first feature corresponding to the first video frame and a second feature corresponding to the second video frame; and inputting the first feature and the second feature to an ith level of the encoder to obtain a $(2*i-1)$th feature corresponding to the first video frame and a $(2*i)$th feature corresponding to the second video frame, i being an integer between 2 and N. Here, the $(2*N-1)$th feature is obtained as the first target feature corresponding to the first video frame and the $(2*N)$th feature is obtained as the second target feature corresponding to the second video frame.

For example, when N is 4, referring to FIG. 4, step S220 may include step S221 to step S224.

Step S221: Input the first video frame and the second video frame to a first level of the encoder to obtain a first feature corresponding to the first video frame and a second feature corresponding to the second video frame.

Step S222: Input the first feature and the second feature to a second level of the encoder to obtain a third feature corresponding to the first video frame and a fourth feature corresponding to the second video frame.

Step S223: Input the third feature and the fourth feature to a third level of the encoder to obtain a fifth feature corresponding to the first video frame and a sixth feature corresponding to the second video frame.

Step S224: Input the fifth feature and the sixth feature to a fourth level of the encoder to obtain the first target feature corresponding to the first video frame and the second target feature corresponding to the second video frame.

In order to obtain more image feature information from the first video frame and the second video frame, this embodiment of the present disclosure uses the pyramid encoder to obtain deep image feature information from image information of the inputted first video frame and second video frame.

In one embodiment, the computer device may separately obtain four pairs of pyramid features $$\{\Phi_0^k, \Phi_1^k\}$$

with different resolutions and quantities of channels from the convolution blocks of each level by inputting two adjacent video frames to the various levels of the pyramid encoder in sequence, where k is the quantity of the levels of the encoder. For example, the first video frame $I_0$ and the second video frame $I_1$ are inputted to convolution block $E^1$ of the first level of the pyramid encoder, to obtain the first feature $$\Phi_0^1$$

corresponding to the first video frame $I_0$ and the second feature $$\Phi_1^1$$

corresponding to the second video frame $I_1$. The first feature $$\Phi_0^1$$

and the second feature $$\Phi_1^1$$

are inputted to convolution block $E^2$ of the second level to obtain the third feature $$\Phi_0^2$$

and the fourth feature $$\Phi_1^2.$$

The third feature $$\Phi_0^2$$

and the fourth feature $$\Phi_1^2$$

are inputted to convolution block $E^3$ of the third level to obtain the fifth feature $$\Phi_0^3$$

and the sixth feature $$\Phi_1^3.$$

The fifth feature $$\Phi_0^3$$

and the sixth feature $$\Phi_1^3$$

are inputted to convolution block $E^4$ of the fourth level (the lowest level) to obtain the first target feature $$\Phi_0^4$$

and the second target feature $$\Phi_1^4.$$

Step S230: Perform a transformation operation (also called warp operation) on the features obtained at the first level to the (N−1)th level of the encoder to obtain corresponding transformed features (also called warped features). For example, a transformation operation on a (j*2−1)th feature and a (j*2)th feature of a jth level is performed to obtain a (j*2−1)th transformed feature and a (j*2)th transformed feature, j being an integer between 1 and N−1.

The transformation operation is a mathematical operation (Warp operation) that performs feature transformation on feature data. In this embodiment of the present disclosure, it is used for transforming the video frame features generated by the convolution blocks of the encoder into inputted features that can be used by the decoder.

In one embodiment, after obtaining the pyramid features $$\{\Phi_0^k, \Phi_1^k\}$$

corresponding to the various levels of the encoder, the transformation operation can be performed on the features obtained at the first level to the third level of the encoder to obtain the corresponding transformed features $$\{\tilde{\Phi}_0^k, \tilde{\Phi}_1^k\}.$$

For example, the transformation operation is performed on the first feature $$\Phi_0^1$$

and the second feature $$\Phi_1^1$$

of the first level to obtain the first transformed feature $$\tilde{\Phi}_0^1$$

and the second transformed feature $$\tilde{\Phi}_1^1.$$

Further, the transformation operation is performed on the third feature $$\Phi_0^2$$

and the fourth feature $$\Phi_1^2$$

of the second level to obtain the third transformed feature $$\tilde{\Phi}_0^2$$

and the fourth transformed feature $$\tilde{\Phi}_1^2.$$

The transformation operation is performed on the fifth feature $$\Phi_0^3$$

and the sixth feature $$\Phi_1^3$$

of the third level to obtain the fifth transformed feature $$\tilde{\Phi}_0^3$$

and the sixth transformed feature $$\tilde{\Phi}_1^3.$$

Step S240: Input the first target feature and the second target feature to the decoder to obtain a first target optical flow and a second target optical flow.

In some embodiments, after the deep image feature information is extracted from the image information of the first video frame and the second video frame inputted by the encoder, the computer device may use the decoder to calculate the features extracted by the encoder, so as to predict optical flows from the to-be-generated target intermediate video frame to two video frames adjacent to the to-be-generated target intermediate video frame, that is, the first target optical flow and the second target optical flow.

In some embodiments, the decoder comprises N levels, N being an integer greater than 2. Step S240 may include: inputting the first target feature and the second target feature outputted from the Nth level of the encoder to a Nth level of the decoder to obtain a first optical flow, a second optical flow, and a first intermediate frame feature; and inputting a $(2*k-1)$th optical flow, a $(2*k)$th optical flow, a kth intermediate frame feature, a $(2*(N-k)-1)$th transformed feature, and a $(2*(N-k))$th transformed feature to a $(N-k)$th level of the decoder to obtain a $(2*k+1)$th optical flow, a $(2*k+2)$th optical flow, and a $(k+1)$th intermediate frame feature, k being an integer between 1 and $N-1$. Here, the $(2*N-1)$th optical flow is obtained as the first target optical flow and the $(2*N)$th optical flow is obtained as the second target optical flow.

For example, when N is 4, referring to FIG. 5, step S240 may include step S241 to step S244.

Step S241: Input the first target feature and the second target feature outputted from the fourth level of the encoder to a fourth level of the decoder to obtain a first optical flow, a second optical flow, and a first intermediate frame feature.

Step S242: Input the first optical flow, the second optical flow, the first intermediate frame feature, the fifth transformed feature, and the sixth transformed feature to the third level of the decoder to obtain a third optical flow, a fourth optical flow, and a second intermediate frame feature.

Step S243: Input the third optical flow, the fourth optical flow, the second intermediate frame feature, the third transformed feature, and the fourth transformed feature to a second level of the decoder to obtain a fifth optical flow, a sixth optical flow, and a third intermediate frame feature.

Step S244: Input the fifth optical flow, the sixth optical flow, the third intermediate frame feature, the first transformed feature, and the second transformed feature to a first level of the decoder to obtain the first target optical flow and the second target optical flow, as well as an integration parameter and a residual R.

In one embodiment, the computer device may input the first target feature $$\Phi_0^4$$

and the second target feature $$\Phi_1^4$$

outputted from the fourth level of the encoder to convolution block $D^4$ of the fourth level of the decoder to obtain the first optical flow $$F_{t\to0}^3,$$

the second optical flow $$F_{t\to0}^3,$$

and the first intermediate frame feature $$\hat{\Phi}_t^3.$$

The computer device inputs the first optical flow $$F_{t\to0}^3,$$

the second optical flow $$F_{t\to1}^3,$$

the first intermediate frame feature $$\hat{\Phi}_t^3,$$

the fifth transformed feature $$\Phi_0^3,$$

and the sixth transformed feature $$\tilde{\Phi}_1^3$$

are input to convolution block $D^3$ of the third level of the decoder to obtain the third optical flow $$F_{t\to0}^2,$$

the fourth optical flow $$F_{t\to0}^2,$$

and the second intermediate frame feature $$\hat{\Phi}_t^2.$$

The computer device inputs the third optical flow $$F_{t\to0}^2,$$

the fourth optical flow $$F_{t\to1}^2,$$

the second intermediate frame feature $$\hat{\Phi}_t^2,$$

the third transformed feature $$\Phi_0^2,$$

and the fourth transformed feature $$\Phi_1^2$$

to convolution block $D^2$ of the second level of the decoder to obtain a fifth optical flow $$F_{t \to 0}^1,$$

a sixth optical flow $$F_{t \to 0}^1,$$

and a third intermediate frame feature $$\hat{\Phi}_t^1.$$

The computer device inputs the fifth optical flow $$F_{t \to 0}^1,$$

the sixth optical flow $$F_{t \to 1}^1,$$

the third intermediate frame feature $$\hat{\Phi}_t^1,$$

the first transformed feature $$\Phi_0^1,$$

and the second transformed feature $$\Phi_1^1$$

to convolution block $D^1$ of the first level of the decoder to obtain the first target optical flow $F_{t \to 0}$ and the second target optical flow $F_{t \to 1}$, as well as the integration parameter (M) Mask and the residual R.

For example, a calculation process of inputting the first target feature and the second target feature to the decoder to obtain the first target optical flow and the second target optical flow may be in accordance with the following formulas:

$$\left[F_{t \to 0}^3, F_{t \to 1}^3, \hat{\Phi}_t^3\right] = D^4\left(\left[\Phi_0^4, \Phi_1^4\right]\right)$$

$$\left[F_{t \to 0}^2, F_{t \to 1}^2, \hat{\Phi}_t^2\right] = D^3\left(\left[F_{t \to 0}^3, F_{t \to 1}^3, \hat{\Phi}_t^3, \Phi_0^3, \Phi_1^3\right]\right)$$

$$\left[F_{t \to 0}^1, F_{t \to 1}^1, \hat{\Phi}_t^1\right] = D^2\left(\left[F_{t \to 0}^2, F_{t \to 1}^2, \hat{\Phi}_t^2, \Phi_0^2, \Phi_1^2\right]\right)$$

$$[F_{t \to 0}, F_{t \to 1}, M, R] = D^1\left(\left[F_{t \to 0}^1, F_{t \to 1}^1, \hat{\Phi}_t^1, \Phi_0^1, \Phi_1^1\right]\right)$$

Step S250: Generate a first candidate video frame and a second candidate video frame according to the first target optical flow, the second target optical flow, the first video frame, and the second video frame.

The first candidate video frame and the second candidate video frame are obtained from the optical flows corresponding to the first video frame and the second video frame through the transformation operation. For example, referring to FIG. 6, step S250 may include step S251 to step S252.

Step S251: Perform the transformation operation on the first target optical flow and the first video frame to obtain the first candidate video frame.

Step S252: Perform the transformation operation on the second target optical flow and the second video frame to obtain the second candidate video frame.

In one embodiment, a Warp operation may be used to calculate the first candidate video frame $\tilde{I}_0$ from the first target optical flow $F_{t \to 0}$ and the first video frame $I_0$. Similarly, the Warp operation may be used to calculate the second candidate video frame $\tilde{I}_1$ from the second target optical flow $F_{t \to 1}$ and the second video frame.

For example, a calculation process of the transformation operation may be in accordance with the following formulas:

$$\tilde{I}_0 = w(I_0, F_{t \to 0})$$

$$\tilde{I}_1 = w(I_1, F_{t \to 1})$$

where w is used to represent the Warp operation, also referred to as the transformation operation.

Step S260: Generate the target intermediate video frame based on the first candidate video frame, the second candidate video frame, the integration parameter, and the residual.

In one embodiment, the computer device may generate the target intermediate video frame $\hat{I}_t$ based on the first candidate video frame $\tilde{I}_0$, the second candidate video frame $\tilde{I}_1$, the integration parameter M, and the residual R. For example, a calculation process of generating the target intermediate video frame can be in accordance with the following formula:

$$\hat{I}_t = M \odot \tilde{I}_0 + (1 - M) \odot \tilde{I}_1 + R$$

where ⊙ is an operator for element-wise multiplication. The integration parameter M is a single-channel merge mask with an element range of 0 to 1. The integration parameter M may adjust a mixing ratio according to a blockage. Through the integration parameter M, the first candidate video frame and the second candidate video frame may be integrated to generate the target intermediate video frame.

The residual R is a three-channel image residual that can compensate for contextual details. When a region of a target frame is blocked or undergoes a sudden brightness change in both views, the residual R may compensate for some details. For example, when image textures of a reconstructed video frame are not sharp enough, the residual R may supplement texture information, making images corresponding to the video frame displayed more realistic.

Step S270: Interpolate the target intermediate video frame between the first video frame and the second video frame.

In this embodiment, a specific implementation of step S270 may refer to the explanation of step S130 provided in the above embodiment, and will not be repeated here.

In this embodiment of the present disclosure, the computer device may obtain the first video frame and the second video frame from the target video, and input the first video frame and the second video frame to the encoder to obtain the first target feature corresponding to the first video frame and the second target feature corresponding to the second video frame. The computer device performs the transformation operation on the features obtained at the first level to the third level of the encoder to obtain the corresponding transformed features, inputs the first target feature and the second target feature to the decoder to obtain the first target optical flow and the second target optical flow, thereby generating the target intermediate video frame based on the first candidate video frame, the second candidate video frame, the integration parameter, and the residual, and interpolates the target intermediate video frame between the first video frame and the second video frame. Thus, video frame feature extraction, estimation of the optical flow of the intermediate video frame, and integration of the front and rear video frames are unified into a complete neural network, which can directly generate the optical flows from the intermediate frame to the adjacent frames, improve the efficiency of generating intermediate video frames, and facilitating processing more complex motion scenes.

As shown in FIG. 7, FIG. 7 schematically shows still another video processing method provided according to an embodiment of the present disclosure. The video processing method may include step S310 and step S390.

Considering that there is a high requirement for a speed of video frame interpolation in practical application scenes, the dependency on an external optical flow network to generate an optical flow can be eliminated, so that the target neural network directly generates an optical flow. This can effectively increase the speed of a network for generating an optical flow, thereby improving the speed of video frame interpolation. Therefore, the present disclosure transfers (knowledge distillation) the knowledge of the pre-trained optical flow network to the target neural network, thereby eliminating the dependency on the external optical flow network. In this embodiment of the present disclosure, the computer device may use the optical flow distillation constraint to ensure that the optical flow of the finally trained target neural network is almost consistent with the optical flow of the true intermediate video frame generated by the pre-trained preset optical flow network.

Step S310: Obtain a first sample video frame and a second sample video frame from a to-be-trained video, and input the first sample video frame and the second sample video frame to the encoder of the preset neural network to obtain a first training feature and a second training feature.

For the target neural network in the aforementioned embodiment, this embodiment of the present disclosure also includes a training method of the target neural network. The training of the target neural network may be carried out in advance according to an obtained training dataset. Subsequently, when video frame interpolation is required for the target video at each time, the trained target neural network can be used to generate the target intermediate video frame, instead of training the target neural network every time the target video is processed.

The video frame interpolation method provided in this embodiment of the present disclosure can use dataset Vimeo90K as a training set in the training process of the preset neural network. Vimeo90K is a large-scale, high-quality video dataset for video processing. The dataset contains 89800 video clips, covering a large number of scenes and actions. It is designed specifically for the following four video processing tasks: video frame interpolation, video denoising, video deblocking, and video super-resolution.

In some embodiments, according to requirements of the video processing tasks corresponding to this embodiment of the present disclosure, that is, video frame interpolation, a triplet dataset can be selected from the Vimeo90K. The triplet dataset is composed of 73171 three-frame video frame sequences with a fixed resolution of 448×256, extracted from a 15K selected video clip of the Vimeo90K.

In this embodiment of the present disclosure, the training sample set may include multiple to-be-trained videos. The to-be-trained videos include multiple video frames, and there may be a true sample intermediate frame (Ground Truth) between two adjacent video frames. In some embodiments, a large number of to-be-trained videos may be obtained from an open source video database to construct a training sample set. The preset neural network refers to a to-be-trained network used for generating intermediate video frames. The preset neural network is the target neural network once it is trained.

In one embodiment, the computer device may obtain every two adjacent pieces of video frame data from the to-be-trained video as the first sample video frame and the second sample video frame. The first sample video frame and the second sample video frame can be simultaneously inputted to the encoder of the preset neural network, and then the lowest level (the fourth level) of the encoder outputs the first training feature corresponding to the first sample video frame and the second training feature corresponding to the second sample video frame.

Step S320: Input the first training feature and the second training feature to the decoder of the preset neural network to generate a training optical flow and a training intermediate frame feature.

The training optical flow refers to an optical flow corresponding to the first sample video frame and an optical flow corresponding to the second sample video frame, and is correspondingly generated by the convolution blocks of the various levels of the decoder of the preset neural network in the training process.

In one embodiment, the computer device may input the first training feature and the second training feature generated by the encoder to the decoder of the preset neural network, and then the convolution blocks at each level of the decoder generate the training optical flow $$\overset{V^k}{F_{t \to 0}}$$

corresponding to the first sample video frame and the training optical flow $$\overset{V^k}{F_{t \to 1}}$$

corresponding to the second sample video frame, where k is a quantity of the levels.

Step S330: Calculate a first loss value based on a true sample optical flow and the training optical flow according to the optical flow distillation constraint.

In order to cause the optical flow generated and learned by the preset neural network to be almost consistent with the optical flow of the true intermediate video frame, the first loss value can be calculated based on the true sample optical flow and the training optical flow according to the optical flow distillation constraint. For example, referring to FIG. 8, step S330 may include step S331 to step S333.

Step S331: Obtain a true sample video frame.

Step S332: Input a true sample intermediate frame to a preset optical flow network to calculate a true sample optical flow.

The true sample video frame includes a true sample intermediate frame $$I_t^{gt}$$

and two video frames $$I_{t \to 0}^{gt}$$

and $$I_{t \to 1}^{gt}$$

and adjacent to the true sample intermediate frame. The preset optical flow network is a pre-trained optical flow network. The preset optical flow network is used for calculating a true sample optical flow $$F_{t \to 0}^{P}$$

from the true sample intermediate frame $$I_t^{gt}$$

to its previous video frame $$I_{t \to 0}^{gt}$$

and a true sample optical flow $$F_{t \to 1}^{P}$$

from the true sample intermediate frame $$I_t^{gt}$$

to its latter video frame $$I_{t \to 1}^{gt}$$

In one embodiment, the computer device may obtain the true sample video frame from the training sample set, and input the true sample intermediate frame $$I_t^{gt}$$

and two video frames $$I_{t \to 0}^{gt}$$

and $$I_{t \to 1}^{gt}$$

adjacent to the true sample intermediate frame to the preset optical flow network, thereby obtaining the true sample optical flow $$F_{t \to 0}^{P}$$

and the true sample optical flow $$F_{t \to 1}^{P}.$$

Step S333: Perform loss calculation on the true sample optical flow and the training optical flow based on the optical flow distillation constraint, to obtain the first loss value.

In one embodiment, the computer device determines a weighting coefficient according to the true sample optical flow $$F_{t \to l}^{P}$$

and the training optical flow $$\bar{F}_{t \to l}^{k}$$

predicted by the highest level of the decoder. The weighting coefficient $P_l$ may be obtained according to the following formula:

$$P_l = \exp\left(-\beta |\bar{F}_{t \to l}^{k} - F_{t \to l}^{P}|_{epe}\right)$$

where $\beta$ is a fixed parameter greater than zero, and l is a video frame sequence. The weighting coefficient $P_l$ may be determined according to a similarity between the training optical flow predicted by the highest level of the decoder and the true sample optical flow. If the similarity is higher, the weighting coefficient $P_l$ at the corresponding position is larger. Otherwise, the weighting coefficient $P_l$ is smaller. An optical flow predicted by the preset neural network can be more accurate by using the weighting coefficient $P_l$, so that the weighting coefficient $P_l$ can be used for improving the accuracy of learning video frame features by the preset neural network.

Further, the computer device determines a scaling factor u. The scaling factor u is used for keeping the first training optical flow and the second training optical flow having the same spatial size as the spatial size of the true sample optical flow. For example, up sample may be performed on the true sample optical flows to separately scale the true sample optical flows to the same spatial sizes as the spatial sizes of the training optical flows outputted by the various levels of the decoder, thus facilitating the optical flow distillation constraint.

Further, the loss calculation is performed on the weighting coefficient, the scaling factor, the true optical flow, and the training optical flow based on the optical flow distillation constraint, to obtain the first loss value. The first loss value $L_d$ may be obtained according to the following formula:

$$L_d = \sum_{k=1}^{3} \sum_{l=0}^{1} \rho\left(P_l \odot \left(u_{2^k}\left(F_{t \to l}^{k}\right) - F_{t \to l}^{P}\right)\right)$$

where $\rho$ is a fixed parameter, which can be set according to an actual need of the training process and will not be limited here.

Step S340: Calculate a second loss value based on true sample intermediate frame features and the training intermediate frame feature according to the feature consistency constraint.

In order to enable the preset neural network to obtain more image information from the video frames, during the training of the preset neural network, if feature information of the learned intermediate video frame is closer to feature information of the true sample intermediate frame, it indicates that the intermediate video frame generated by the preset neural network is more realistic, thereby improving the visualization effect of video frame interpolation. Therefore, in this embodiment of the present disclosure, the preset neural network can be trained using the feature consistency constraint.

Step S341: Obtain a parameter sharing encoder.

Step S342: Input the true sample intermediate frame to the parameter sharing encoder to obtain the true sample intermediate frame features corresponding to the various levels of the decoder of the preset neural network.

The parameter sharing encoder refers to an encoder having same parameters as parameters of the encoder of the preset neural network. In one embodiment, the computer device may input the true sample intermediate frame $$I_t^{gt}$$

into the parameter sharing encoder, and then the convolution blocks of the various levels of the parameter sharing encoder output the corresponding true sample intermediate frame features $$\hat{\Phi}_t^{k}.$$

Step S343: Perform loss calculation on the true sample intermediate frame features and the training intermediate frame feature based on the feature consistency constraint to obtain the second loss value.

In one embodiment, the computer device may perform the feature consistency constraint on the true sample intermediate frame feature $$\hat{\Phi}_t^{k}$$

and the training intermediate frame feature $$\check{\Phi}_t^{k},$$

and calculate the second loss value. The second loss value $L_g$ may be obtained according to the following formula:

$$L_g = \sum_{k=1}^{3} L_{cen}\left(\hat{\Phi}_t^{k}, \check{\Phi}_t^{k}\right)$$

where $L_{cen}$ is the commonly used Census loss function. Considering that excessive constraint will damage information contained in the reconstructed training intermediate frame feature, and inspired by a local geometric alignment characteristic of Census transformation, the feature consistency constraint is expanded, that is, a Census loss is expanded to a multi-scale feature space for progressive supervision, to calculate a Soft Hamming distance between the true sample intermediate frame feature $$\hat{\Phi}_t^{k}$$

and the training intermediate frame feature $$\check{\Phi}_t^{k}.$$

Step S350: Calculate a third loss value according to the true sample intermediate frame and the training intermediate frame.

In order to keep the intermediate video frame $\hat{I}_t$ generated by the preset neural network close to the true sample intermediate frame $$I_t^{gt},$$

constraint can be carried out between the intermediate video frame and the true sample intermediate frame. In one embodiment, the third loss value $L_r$ is calculated according to the true sample intermediate frame $$I_t^{gt}$$

and the training intermediate frame $\check{I}_r$. The third loss value can be obtained according to the following formula:

$$L_r = \rho\big(\check{I}_t - I_t^{gt}\big) + L_{cen}\big(\check{I}_t, I_t^{gt}\big)$$

where $\rho(x)=(x^2+\epsilon^2)^{\alpha}$, $\alpha$, and $\epsilon$ are fixed parameters that can be set according to an actual need in the training process, and are not limited here.

Step S360: Determine a total loss value of the preset neural network based on the first loss value, the second loss value, and the third loss value, and perform iterative training on the preset neural network according to the total loss value until the preset neural network satisfies a preset condition, to obtain the target neural network.

The preset condition may be as follows: the total loss value is less than a preset value, the total loss value no longer changes, or a number of training times reaches a preset number of times. It can be understood that after the preset neural network is iteratively trained in multiple training cycles according to the training sample set, each training cycle including multiple iterative trainings to continuously optimize the parameters of the preset neural network, the above total loss value is smaller and smaller, and finally decreases to a fixed value or is less than the above preset value. At this time, it indicates that the preset neural network converges. Of course, it can also be determined that the preset neural network has converged after the number of training times reaches the present number of times.

In one embodiment, the total loss value $L=\lambda L_d+\eta L_g+L_r$ ($\lambda$ and $\eta$ are weight parameters) of the preset neural network is determined based on the first loss value $L_d$, the second loss value $L_g$, and the third loss value $L_r$, and the preset neural network is iteratively trained according to the total loss value until the preset neural network satisfies the preset condition, to obtain the target neural network.

For example, in order to evaluate the performance of the video frame interpolation method proposed in the present disclosure, the video frame interpolation method in the present disclosure can be tested and compared, on the same dataset, with other video frame interpolation methods. For example, although the training of the target neural network is carried out on the Vimeo90K training set, the video frame interpolation method proposed in the present disclosure can be evaluated on various datasets covering different motion scenes for comprehensive comparison.

Quantitative evaluation uses common indexes such as PSNR and SSIM. The dataset may include:

The Vimeo90K dataset contains three-frame video frames with a 448×256 resolution. 51.312 three-frame video frames are used for training, and 3.782 three-frame video frames are used for testing. Dataset UCF101 can use a test set selected from DVF. The test set includes 379 three-frame video frames with a size of 256×256. Dataset SNU-FILM is a recently proposed VFI benchmark that includes 1240 three-frame video frames with a resolution of about 1280×720. According to the amplitude of motion, it is divided into four parts: easy, medium, difficult, and extreme.

FIG. 10 shows a diagram of speed-effect comparison of a frame interpolation method. The speed is 11.6 times faster on the premise that the video frame interpolation method (IFR-Net/IFR-Net Large) of the present disclosure achieves a frame interpolation effect close to the frame interpolation effects of other video frame interpolation methods. For a 720P video, the video frame interpolation method of the present disclosure can complete frame interpolation on an image on a Nvidia V100 graphics card within 25 milliseconds.

Meanwhile, in this embodiment of the present disclosure, relatively complex cases in some datasets are selected for the video frame interpolation operation, and frame interpolation results of these cases are visualized, for example, a diagram of a visualization effect of video frame interpolation shown in FIG. 11. In case of a relatively large motion, a picture obtained by performing frame interpolation in the video frame interpolation method in the present disclosure is clearer on a motion boundary of an object and contains richer texture details. In addition, on a standard dataset, performance test and comparison are performed between the video frame interpolation method of the present disclosure and other video frame interpolation methods. According to FIG. 12 showing a diagram of a test result of video frame interpolation, it can be seen that the video frame interpolation method (IFR-Net/IFR-Net Large) in the present disclosure achieves the best performance under different evaluation indexes compared to other video frame interpolation methods.

The novel and efficient depth architecture provided in the embodiments of the present disclosure is referred to as IFR-Net, which is used for video frame interpolation, and this depth architecture does not have any cascading refinement units. The depth architecture can gradually refine the optical flow of the intermediate video frame along with the excellent intermediate frame feature, which can not only promote optical flow estimation to synthesize clear motion boundaries, but also provide global representations to generate vivid contextual details. In addition, the new task-oriented optical flow distillation constraint and feature consistency constraint provided by the embodiments of the present disclosure can fully unleash the potential of the IFR-Net. Experiments on various benchmarks have demonstrated that the proposed video frame interpolation method has advanced performance and high inference speed compared to the existing video frame interpolation methods.

Step S370: Obtain a first video frame and a second video frame from a target video, input the first video frame and the second video frame to a target neural network, and obtain a target intermediate video frame output by the target neural network.

Step S380: Interpolate the target intermediate video frame between the first video frame and the second video frame.

In this embodiment, specific implementations of step S370 and step S380 may respectively refer to the explanations of step S110 to step S130 provided in the above embodiment, and will not be repeated here.

Referring to FIG. 13, FIG. 13 shows a structural block diagram of a video processing apparatus 400 provided according to an embodiment of the present disclosure. The video processing apparatus 400 includes: an obtaining module 410, configured to obtain a first video frame and a second video frame in a target video, the first video frame being a previous frame of the second video frame; an outputting module 420, configured to: input the first video frame and the second video frame to a target neural network, and obtain a target intermediate video frame output by the target neural network, the target neural network being trained based on an optical flow distillation constraint and a feature consistency constraint; and a frame interpolation module 430, configured to interpolate the target intermediate video frame between the first video frame and the second video frame.

In some embodiments, the target neural network includes an encoder and a decoder, and the outputting module 430 may include: a target feature generation unit, configured to input the first video frame and the second video frame to the encoder to obtain a first target feature corresponding to the first video frame and a second target feature corresponding to the second video frame; a target optical flow generation unit, configured to input the first target feature and the second target feature to the decoder to obtain a first target optical flow and a second target optical flow; and target video frame generation unit, configured to generate the target intermediate video frame according to the first target optical flow and the second target optical flow.

In some embodiments, the encoder includes four levels; and the target feature generation unit may include: a first feature generation subunit configured to input the first video frame and the second video frame to a first level of the encoder to obtain a first feature corresponding to the first video frame and a second feature corresponding to the second video frame; a second feature generation subunit, configured to input the first feature and the second feature to a second level of the encoder to obtain a third feature corresponding to the first video frame and a fourth feature corresponding to the second video frame; a third feature generation subunit, configured to input the third feature and the fourth feature to a third level of the encoder to obtain a fifth feature corresponding to the first video frame and a sixth feature corresponding to the second video frame; and a fourth feature generation subunit, configured to input the fifth feature and the sixth feature to a fourth level of the encoder to obtain the first target feature corresponding to the first video frame and the second target feature corresponding to the second video frame.

In some embodiments, the target feature generation unit may include: a first feature transformation subunit, configured to perform a transformation operation on the first feature and the second feature of the first level to obtain a first transformed feature and a second transformed feature; a second feature transformation subunit, configured to perform a transformation operation on the third feature and the fourth feature of the second level to obtain a third transformed feature and a fourth transformed feature; and a third feature transformation subunit, configured to perform a transformation operation on the fifth feature and the sixth feature of the third level to obtain a fifth transformed feature and a sixth transformed feature.

In some embodiments, the decoder includes four levels; and the target optical flow generation unit may include: a first optical flow generation subunit, configured to input the first target feature and the second target feature outputted from the fourth level of the encoder to a fourth level of the decoder to obtain a first optical flow, a second optical flow, and a first intermediate frame feature; a second optical flow generation subunit, configured to input the first optical flow, the second optical flow, the first intermediate frame feature, the fifth transformed feature, and the sixth transformed feature to a three level of the decoder to obtain a third optical flow, a fourth optical flow, and a second intermediate frame feature; a third optical flow generation subunit, configured to input the third optical flow, the fourth optical flow, the second intermediate frame feature, the third transformed feature, and the fourth transformed feature to a second level of the decoder to obtain a fifth optical flow, a sixth optical flow, and a third intermediate frame feature; and a fourth optical flow generation subunit, configured to input the fifth optical flow, the sixth optical flow, the third intermediate frame feature, the first transformed feature, and the second transformed feature to a first level of the decoder to obtain the first target optical flow and the second target optical flow.

In some embodiments, the target optical flow generation unit may be specifically configured to input the first target feature and the second target feature to the decoder to obtain the first target optical flow, the second target optical flow, an integration parameter, and a residual.

The target video frame generation unit may include: a candidate frame generation subunit, configured to generate a first candidate video frame and a second candidate video frame according to the first target optical flow, the second target optical flow, the first video frame, and the second video frame; and a target intermediate video frame generation subunit, configured to generate the target intermediate video frame based on the first candidate video frame, the second candidate video frame, the integration parameter, and the residual.

In some embodiments, the candidate frame generation subunit may be specifically configured to: perform the transformation operation on the first target optical flow and the first video frame to obtain the first candidate video frame; and perform the transformation operation on the second target optical flow and the second video frame to obtain the second candidate video frame.

In some embodiments, the video processing apparatus 400 may further include: a sample obtaining module, configured to obtain a first sample video frame and a second sample video frame from a to-be-trained video; a training feature generation module, configured to input the first sample video frame and the second sample video frame to the encoder of the preset neural network to obtain a first training feature and a second training feature; a training optical flow generation module, configured to input the first training feature and the second training feature to the decoder of the preset neural network to generate a training optical flow and a training intermediate frame feature; a first loss calculation module, configured to calculate a first loss value based on a true sample optical flow and the training optical flow according to the optical flow distillation constraint; a second loss calculation module, configured to calculate a second loss value based on true sample intermediate frame features and the training intermediate frame feature according to the feature consistency constraint; a third loss calculation module, configured to calculate a third loss value according to the true sample intermediate frame and the training intermediate frame; a loss determining module, configured to determine a total loss value of the preset neural network based on the first loss value, the second loss value, and the third loss value; and a network training module, configured to perform iterative training on the preset neural network according to the total loss value until the preset neural network satisfies a preset condition, to obtain the target neural network.

In some embodiments, the first loss calculation module may include: a sample obtaining unit, configured to obtain a true sample video frame, the true sample video frame including a true sample intermediate frame and two video frames adjacent to the true sample intermediate frame; a sample optical flow calculation unit, configured to input the true sample video frame to a preset optical flow network to calculate a true sample optical flow; and a first loss calculation unit, configured to perform loss calculation on the true sample optical flow and the training optical flow based on the optical flow distillation constraint, to obtain the first loss value.

In some embodiments, the first loss calculation unit may be specifically configured to: determine a weighting coefficient according to the true sample optical flow and the training optical flow, the weighting coefficient being used for improving accuracy of the preset neural network in learning video frame features; determine a scaling factor, the scaling factor being used for scaling the true sample optical flow to a same spatial size as a spatial size of the training optical flow; and perform loss calculation on the weighting coefficient, the scaling factor, the true optical flow, and the training optical flow based on the optical flow distillation constraint, to obtain the first loss value.

In some embodiments, the second loss calculation module may be specifically configured to: obtain a parameter sharing encoder; input the true sample intermediate frame to the parameter sharing encoder to obtain the true sample intermediate frame features corresponding to the various levels of the decoder of the preset neural network; and perform loss calculation on the true sample intermediate frame features and the training intermediate frame feature based on the feature consistency constraint, to obtain the second loss value.

A person skilled in the art can clearly understand that, for simple and clear description, for specific work processes of the foregoing described apparatus and modules, please refer to the corresponding process in the foregoing method embodiments, and details are not described here again.

In the several embodiments provided in the present disclosure, coupling of modules to one another may be electrical, mechanical or otherwise.

In addition, functional modules in the embodiments of in the present disclosure may be integrated into one processing module, or each of the modules may exist alone physically, or two or more modules are integrated into one module. The integrated module may be implemented in a form of hardware, or may be implemented in a form of a software functional module.

According to the solutions provided in the present disclosure, a computer device can obtain a first video frame and a second video frame from a target video, input the first video frame and the second video frame to a target neural network, and obtain a target intermediate video frame output by the target neural network. The target neural network is trained based on an optical flow distillation constraint and a feature consistency constraint. Further, the computer device can interpolate the target intermediate video frame between the first video frame and the second video frame. Therefore, knowledge of a pre-trained optical flow network is transferred to learning of the target neural network through the optical flow distillation constraint, thereby eliminating dependency on an external optical flow network. In addition, the network can learn more intermediate frame information through the feature consistency constraint, thereby improving the efficiency of generating an optical flow from an intermediate frame to an adjacent frame.

Figure 14:
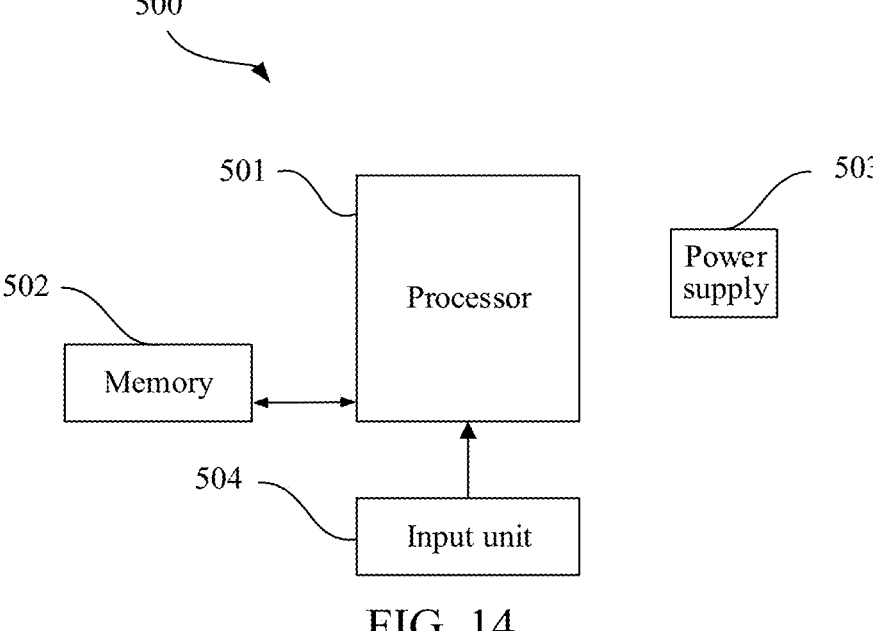
FIG. 14 shows a module block diagram of a computer device provided according to an embodiment of the present disclosure.

As shown in FIG. 14, the embodiments of the present disclosure further provide a computer device 500. The computer device 500 may include components such as a processor 501 with one or more processing cores, a memory 502 with one or more computer-readable storage media, a power supply 503, and an input unit 504. A person of skill in the art can understand that, a structure of the computer device shown in FIG. 6 does not constitute a limit on the computer device, and may include components that are more or fewer than those shown in the figure, or a combination of some components, or different component arrangements.

The processor 501 is a control center of the computer device, and connects to various parts of the entire computer device by using various interfaces and lines. By running or executing software programs and/or modules stored in the memory 502, and invoking data stored in the memory 502, various functions and data processing of the computer device are executed, thereby performing overall monitoring on the computer device. In some embodiments, the processor 501 may include one or more processing cores. In some embodiments, the processor 501 may integrate an application processor and a modem. The application processor mainly processes an operating system, a user interface, an application program, and the like. The modem mainly processes wireless communication. It is understood that the foregoing modem may not be integrated into the processor 501.

The memory 502 may be configured to store software programs and modules. The processor 501 runs the software programs and modules stored in the memory 502, to implement various functional applications and data processing. The memory 502 may mainly include a program storage area and a data storage area. The program storage area may store an operating system, an application program required by at least one function (such as a sound playback function and an image display function), and the like. The data storage area may store data created according to use of a server. In addition, the memory 502 may include a high speed RAM, and may further include a non-volatile memory, such as at least one magnetic disk storage device, a flash memory, or another volatile solid storage device. Correspondingly, the memory 502 may further include a memory controller, so that the processor 501 can access the memory 502.

The computer device further includes the power supply 503 for supplying power to the components. In some embodiments, the power supply 503 may be logically connected to the processor 501 by using a power management system, thereby implementing functions such as charging, discharging, and power consumption management by using the power management system. The power supply 503 may further include one or more direct current or alternating current power supplies, a re-charging system, a power failure detection circuit, a power supply converter or inverter, a power supply state indicator, and any other component.

The computer device may further include the input unit 504. The input unit 504 may be configured to receive inputted numeric or character information and generate keyboard, mouse, joystick, optical, or trackball signal input related to user settings and function control.

Although not shown in the figure, the computer device may further include a display unit, and the like. Details are not described here again. Specifically, in this embodiment, the processor 501 in the computer device may load, according to the following instructions, executable files corresponding to processes of one or more application programs into the memory 502. The processor 501 runs the application programs stored in the memory 502, to implement the steps of the various methods provided in the foregoing embodiments.

Figure 15:
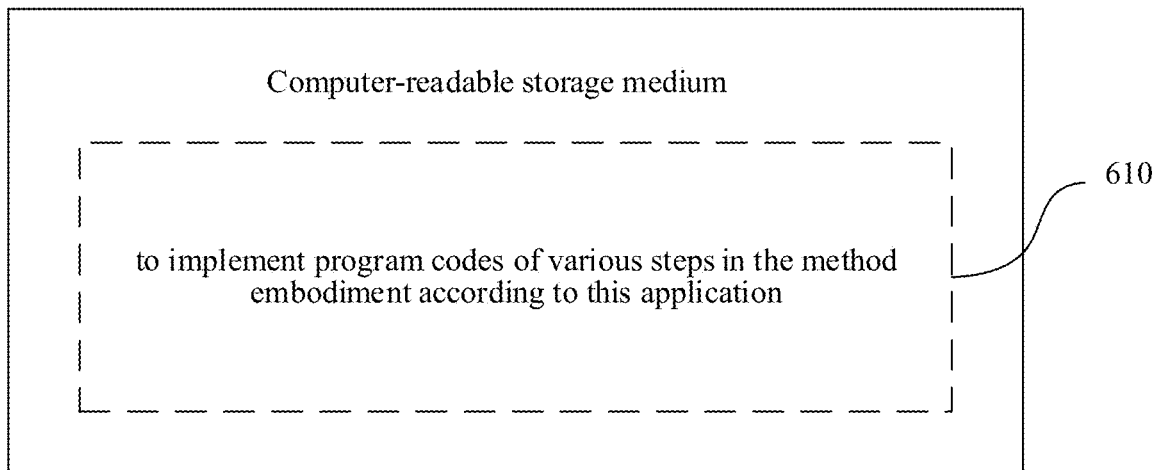
FIG. 15 shows a module block diagram of a computer-readable storage medium provided according to an embodiment of the present disclosure.

As shown in FIG. 15, the embodiments of the present disclosure further provide a computer-readable storage medium 600. The computer-readable storage medium 600 stores computer program instructions 610. The computer program instructions 610 may be invoked by a processor to implement the methods described in the foregoing embodiments.

The computer-readable storage medium may be an electronic memory such as a flash memory, an Electrically Erasable Programmable Read Only Memory (EEPROM), an Erasable Programmable Read Only Memory (EPROM), a hard disk, or a ROM. In some embodiments, the computer readable storage medium includes a non-transitory computer-readable storage medium. The computer-readable storage medium 600 has a storage space for program codes that implement any of the steps in the above method. These program codes can be read from or written to one or more computer program products. The program codes can be compressed in an appropriate form, for example.

According to one aspect of the present disclosure, a computer program product or a computer program is provided. The computer program product or the computer program includes computer instructions stored in a computer-readable storage medium. A processor of a computer device reads the computer instructions from the computer-readable storage medium and executes the computer instructions, causing the computer device to implement the method provided in any example implementations provided in the above embodiments.

All the technical features of the above embodiments can be combined in different manners to form other embodiments. For the sake of brevity, not all possible combinations of all the technical features in the above embodiments are described. However, these technical features shall all be considered to fall within the scope of this specification as long as there is no contradiction in their combinations.

Descriptions above are merely preferred embodiments of the present disclosure, and are not intended to limit the present disclosure. Although the present disclosure has been disclosed above in forms of preferred embodiments, the embodiments are not intended to limit the present disclosure. A person skilled in the art can make some changes to the above disclosed technical content without departing from the scope of the technical solutions of the present disclosure or can modify the technical content as equivalent embodiments with equivalent changes. Any simple alteration, equivalent change or modification made to the foregoing embodiments according to the technical essence of the present disclosure without departing from the content of the technical solutions of the present disclosure shall fall within the scope of the technical solutions of the present disclosure.

What is claimed is:

1. A video processing method, performed by a computer device, and comprising:

obtaining a first video frame and a second video frame in a target video, the first video frame being a previous frame of the second video frame;

inputting the first video frame and the second video frame to a target neural network, and obtaining a target intermediate video frame output by the target neural network, the target neural network being obtained by training a preset neural network based on an optical flow distillation constraint and a feature consistency constraint, the feature consistency constraint being established between training intermediate frame features and true sample intermediate frame features, the training intermediate frame features being generated by a decoder of the preset neural network, the true sample intermediate frame features corresponding to a plurality of levels of the decoder of the preset neural network, the true sample intermediate frame features being obtained by inputting a true sample intermediate frame to a parameter sharing encoder that shares parameters with an encoder of the preset neural network; and interpolating the target intermediate video frame between the first video frame and the second video frame.

2. The method according to claim 1, wherein the target neural network comprises an encoder and a decoder; and the inputting the first video frame and the second video frame to the target neural network, and obtaining the target intermediate video frame output by the target neural network comprises:

inputting the first video frame and the second video frame to the encoder to obtain a first target feature corresponding to the first video frame and a second target feature corresponding to the second video frame;

inputting the first target feature and the second target feature to the decoder to obtain a first target optical flow and a second target optical flow; and generating the target intermediate video frame according to the first target optical flow and the second target optical flow.

3. The method according to claim 2, wherein the encoder comprises N levels, N being an integer greater than 2; and the inputting the first video frame and the second video frame to the encoder to obtain the first target feature corresponding to the first video frame and the second target feature corresponding to the second video frame comprises:

inputting the first video frame and the second video frame to a first level of the encoder to obtain a first feature corresponding to the first video frame and a second feature corresponding to the second video frame; and inputting the first feature and the second feature to an ith level of the encoder to obtain a $(2*i-1)$th feature corresponding to the first video frame and a $(2*i)$th feature corresponding to the second video frame, i being an integer between 2 and N;

wherein the $(2*N-1)$th feature is obtained as the first target feature corresponding to the first video frame and the $(2*N)$th feature is obtained as the second target feature corresponding to the second video frame.

4. The method according to claim 3, wherein N is 4.

5. The method according to claim 3, further comprising:
performing a transformation operation on a $(j*2-1)$th feature and a $(j*2)$th feature of a jth level to obtain a $(j*2-1)$th transformed feature and a $(j*2)$th transformed feature, j being an integer between 1 and N−1.

6. The method according to claim 5, wherein the decoder comprises N levels; and the inputting the first target feature and the second target feature to the decoder to obtain the first target optical flow and the second target optical flow comprises:

inputting the first target feature and the second target feature outputted from the Nth level of the encoder to a Nth level of the decoder to obtain a first optical flow, a second optical flow, and a first intermediate frame feature; and inputting a (2*k−1)th optical flow, a (2*k)th optical flow, a kth intermediate frame feature, a (2*(N−k)−1)th transformed feature, and a (2*(N−k))th transformed feature to a (N−k)th level of the decoder to obtain a (2*k+1)th optical flow, a (2*k+2)th optical flow, and a (k+1)th intermediate frame feature, k being an integer between 1 and N−1;

wherein the (2*N−1)th optical flow is obtained as the first target optical flow and the (2*N)th optical flow is obtained as the second target optical flow.

7. The method according to claim 2, wherein the inputting the first target feature and the second target feature to the decoder to obtain the first target optical flow and the second target optical flow comprises:

inputting the first target feature and the second target feature to the decoder to obtain the first target optical flow, the second target optical flow, an integration parameter, and a residual; and the generating the target intermediate video frame according to the first target optical flow and the second target optical flow comprises:

generating a first candidate video frame and a second candidate video frame according to the first target optical flow, the second target optical flow, the first video frame, and the second video frame; and generating the target intermediate video frame based on the first candidate video frame, the second candidate video frame, the integration parameter, and the residual.

8. The method according to claim 7, wherein the generating the first candidate video frame and the second candidate video frame according to the first target optical flow, the second target optical flow, the first video frame, and the second video frame comprises:

performing the transformation operation on the first target optical flow and the first video frame to obtain the first candidate video frame; and performing the transformation operation on the second target optical flow and the second video frame to obtain the second candidate video frame.

9. The method according to claim 1, further comprising:

obtaining a first sample video frame and a second sample video frame from a video to be trained;

inputting the first sample video frame and the second sample video frame to the encoder of the preset neural network to obtain a first training feature and a second training feature;

inputting the first training feature and the second training feature to the decoder of the preset neural network to generate a training optical flow and the training intermediate frame features;

calculating a first loss value based on a true sample optical flow and the training optical flow according to the optical flow distillation constraint;

calculating a second loss value based on the true sample intermediate frame features and the training intermediate frame features according to the feature consistency constraint;

calculating a third loss value according to the true sample intermediate frame and the training intermediate frame;

determining a total loss value of the preset neural network based on the first loss value, the second loss value, and the third loss value; and performing iterative training on the preset neural network according to the total loss value until the preset neural network satisfies a preset condition, to obtain the target neural network.

10. The method according to claim 9, wherein the calculating the first loss value based on the true sample optical flow and the training optical flow according to the optical flow distillation constraint comprises:

obtaining a true sample video frame, the true sample video frame comprising a true sample intermediate frame and two video frames adjacent to the true sample intermediate frame;

inputting the true sample video frame to a preset optical flow network to calculate a true sample optical flow; and performing loss calculation on the true sample optical flow and the training optical flow based on the optical flow distillation constraint, to obtain the first loss value.

11. The method according to claim 10, wherein the performing loss calculation on the true sample optical flow and the training optical flow based on the optical flow distillation constraint, to obtain the first loss value comprises:

determining a weighting coefficient according to the true sample optical flow and the training optical flow, the weighting coefficient being configured to improve accuracy of the preset neural network in learning video frame features;

determining a scaling factor, the scaling factor being configured to scale the true sample optical flow to a same spatial size as a spatial size of the training optical flow; and performing loss calculation on the weighting coefficient, the scaling factor, the true optical flow, and the training optical flow based on the optical flow distillation constraint, to obtain the first loss value.

12. The method according to claim 9, wherein the calculating the second loss value based on the true sample intermediate frame features and the training intermediate frame features according to the feature consistency constraint comprises:

performing loss calculation on the true sample intermediate frame features and the training intermediate frame features based on the feature consistency constraint, to obtain the second loss value.

13. A video processing apparatus, comprising:

at least one memory; and one or more processors, coupled to the at least one memory;

wherein one or more application programs are stored in the at least one memory and configured to be executed by the one or more processors, and the one or more application programs being configured to implement:

obtaining a first video frame and a second video frame in a target video, the first video frame being a previous frame of the second video frame;

inputting the first video frame and the second video frame to a target neural network, and obtaining a target intermediate video frame output by the target neural network, the target neural network being obtained by training a preset neural network based on an optical flow distillation constraint and a feature consistency constraint, the feature consistency constraint being established between training intermediate frame features and true sample intermediate frame features, the training intermediate frame features being generated by a decoder of the preset neural network, the true sample intermediate frame features corresponding to a plurality of levels of the decoder of the preset neural network, the true sample intermediate frame features being obtained by inputting a true sample intermediate frame to a parameter sharing encoder that shares parameters with an encoder of the preset neural network; and interpolating the target intermediate video frame between the first video frame and the second video frame.

14. The apparatus according to claim 13, wherein the target neural network comprises an encoder and a decoder; and the inputting the first video frame and the second video frame to the target neural network, and obtaining the target intermediate video frame output by the target neural network comprises:

inputting the first video frame and the second video frame to the encoder to obtain a first target feature corresponding to the first video frame and a second target feature corresponding to the second video frame;

inputting the first target feature and the second target feature to the decoder to obtain a first target optical flow and a second target optical flow; and generating the target intermediate video frame according to the first target optical flow and the second target optical flow.

15. The apparatus according to claim 14, wherein the encoder comprises N levels, N being an integer greater than 2; and the inputting the first video frame and the second video frame to the encoder to obtain the first target feature corresponding to the first video frame and the second target feature corresponding to the second video frame comprises:

inputting the first video frame and the second video frame to a first level of the encoder to obtain a first feature corresponding to the first video frame and a second feature corresponding to the second video frame; and inputting the first feature and the second feature to an ith level of the encoder to obtain a (2*i−1)th feature corresponding to the first video frame and a (2*i)th feature corresponding to the second video frame, i being an integer between 2 and N;

wherein the (2*N−1)th feature is obtained as the first target feature corresponding to the first video frame and the (2*N)th feature is obtained as the second target feature corresponding to the second video frame.

16. The apparatus according to claim 15, wherein N is 4.

17. The apparatus according to claim 15, further comprising:

performing a transformation operation on a (j*2−1)th feature and a (j*2)th feature of a jth level to obtain a (j*2−1)th transformed feature and a (j*2)th transformed feature, j being an integer between 1 and N−1.

18. The apparatus according to claim 17, wherein the decoder comprises N levels; and the inputting the first target feature and the second target feature to the decoder to obtain the first target optical flow and the second target optical flow comprises:

inputting the first target feature and the second target feature outputted from the Nth level of the encoder to a Nth level of the decoder to obtain a first optical flow, a second optical flow, and a first intermediate frame feature; and inputting a (2*k−1)th optical flow, a (2*k)th optical flow, a kth intermediate frame feature, a (2*(N−k)−1)th transformed feature, and a (2*(N−k))th transformed feature to a (N−k)th level of the decoder to obtain a (2*k+1)th optical flow, a (2*k+2)th optical flow, and a (k+1)th intermediate frame feature, k being an integer between 1 and N−1;

wherein the (2*N−1)th optical flow is obtained as the first target optical flow and the (2*N)th optical flow is obtained as the second target optical flow.

19. The apparatus according to claim 14, wherein the inputting the first target feature and the second target feature to the decoder to obtain the first target optical flow and the second target optical flow comprises:

inputting the first target feature and the second target feature to the decoder to obtain the first target optical flow, the second target optical flow, an integration parameter, and a residual; and the generating the target intermediate video frame according to the first target optical flow and the second target optical flow comprises:

generating a first candidate video frame and a second candidate video frame according to the first target optical flow, the second target optical flow, the first video frame, and the second video frame; and generating the target intermediate video frame based on the first candidate video frame, the second candidate video frame, the integration parameter, and the residual.

20. A non-transitory computer-readable storage medium, storing program codes, the program codes being invoked by at least one processor to implement:

obtaining a first video frame and a second video frame in a target video, the first video frame being a previous frame of the second video frame;

inputting the first video frame and the second video frame to a target neural network, and obtaining a target intermediate video frame output by the target neural network, the target neural network being obtained by training a preset neural network based on an optical flow distillation constraint and a feature consistency constraint, the feature consistency constraint being established between training intermediate frame features and true sample intermediate frame features, the training intermediate frame features being generated by a decoder of the preset neural network, the true sample intermediate frame features corresponding to a plurality of levels of the decoder of the preset neural network, the true sample intermediate frame features being obtained by inputting a true sample intermediate frame to a parameter sharing encoder that shares parameters with an encoder of the preset neural network; and interpolating the target intermediate video frame between the first video frame and the second video frame.

* * * * *